US008635637B2

(12) United States Patent
Krum et al.

(10) Patent No.: US 8,635,637 B2
(45) Date of Patent: Jan. 21, 2014

(54) USER INTERFACE PRESENTING AN ANIMATED AVATAR PERFORMING A MEDIA REACTION

(75) Inventors: Kyle J. Krum, Sammamish, WA (US); Michael J. Conrad, Monroe, WA (US); Geoffrey J Hulten, Lynnwood, WA (US); Umaimah A. Mendhro, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/309,859

(22) Filed: Dec. 2, 2011

(65) Prior Publication Data

US 2013/0145384 A1    Jun. 6, 2013

(51) Int. Cl.
| | | |
|---|---|---|
| *H04H 9/00* | (2006.01) | |
| *G06F 3/00* | (2006.01) | |
| *H04N 5/228* | (2006.01) | |
| *H04N 5/445* | (2011.01) | |
| *H04N 9/74* | (2006.01) | |
| *H04N 9/76* | (2006.01) | |
| *G06F 3/048* | (2013.01) | |

(52) U.S. Cl.
USPC ............ 725/10; 725/40; 348/222.1; 348/563; 348/564; 348/589; 348/600; 715/861

(58) Field of Classification Search
USPC ........... 725/10, 40; 348/222.1, 563, 564, 589, 348/600; 715/861
See application file for complete search history.

(56) References Cited

U.S. PATENT DOCUMENTS

| | | |
|---|---|---|
| 4,288,078 A | 9/1981 | Lugo |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |

(Continued)

FOREIGN PATENT DOCUMENTS

| | | |
|---|---|---|
| CA | 2775700 | 7/2012 |
| CA | 2775814 | 9/2013 |

(Continued)

OTHER PUBLICATIONS

"Foreign Office Action", Canadian Application No. 2775700, (Aug. 24, 2012), 2 pages.

(Continued)

*Primary Examiner* — Hoang-Vu A Nguyen-Ba
(74) *Attorney, Agent, or Firm* — Wolf-SBMC

(57) ABSTRACT

This document describes techniques and apparatuses enabling a user interface for presenting a media reaction. The techniques receive media reactions of a person to a media program, such as the person laughing at one point of a comedy show, then smiling at another point, and then departing at a third point. The techniques may present these and other media reactions in a user interface through which a user may interact.

20 Claims, 9 Drawing Sheets

(56) References Cited

U.S. PATENT DOCUMENTS

| | | |
|---|---|---|
| 4,901,362 A | 2/1990 | Terzian |
| 4,925,189 A | 5/1990 | Braeunig |
| 4,931,865 A | 6/1990 | Scarampi |
| 5,101,444 A | 3/1992 | Wilson et al. |
| 5,148,154 A | 9/1992 | MacKay et al. |
| 5,175,641 A | 12/1992 | Boerstler et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,528,263 A | 6/1996 | Platzker et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,581,276 A | 12/1996 | Cipolla et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,801,704 A | 9/1998 | Oohara et al. |
| 5,828,779 A | 10/1998 | Maggioni |
| 5,875,108 A | 2/1999 | Hoffberg et al. |
| 5,877,503 A | 3/1999 | Neriishi |
| 5,877,803 A | 3/1999 | Wee et al. |
| 5,904,484 A | 5/1999 | Burns |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,002,808 A | 12/1999 | Freeman |
| 6,005,548 A | 12/1999 | Latypov et al. |
| 6,009,210 A | 12/1999 | Kang |
| 6,054,991 A | 4/2000 | Crane et al. |
| 6,057,909 A | 5/2000 | Yahav et al. |
| 6,066,075 A | 5/2000 | Poulton |
| 6,072,494 A | 6/2000 | Nguyen |
| 6,073,489 A | 6/2000 | French et al. |
| 6,075,895 A | 6/2000 | Qiao et al. |
| 6,077,201 A | 6/2000 | Cheng |
| 6,098,458 A | 8/2000 | French et al. |
| 6,100,517 A | 8/2000 | Yahav et al. |
| 6,100,896 A | 8/2000 | Strohecker et al. |
| 6,101,289 A | 8/2000 | Kellner |
| 6,111,580 A | 8/2000 | Kazama |
| 6,115,482 A | 9/2000 | Sears et al. |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,181,472 B1 | 1/2001 | Liu |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,222,465 B1 | 4/2001 | Kumar et al. |
| 6,226,388 B1 | 5/2001 | Qian et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,291,816 B1 | 9/2001 | Liu |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,377,296 B1 | 4/2002 | Zlatsin et al. |
| 6,384,819 B1 | 5/2002 | Hunter |
| 6,411,744 B1 | 6/2002 | Edwards |
| 6,421,453 B1 | 7/2002 | Kanevsky et al. |
| 6,430,997 B1 | 8/2002 | French et al. |
| 6,476,834 B1 | 11/2002 | Doval et al. |
| 6,496,598 B1 | 12/2002 | Harman |
| 6,498,628 B2 | 12/2002 | Iwamura |
| 6,502,515 B2 | 1/2003 | Burckhardt et al. |
| 6,503,195 B1 | 1/2003 | Keller et al. |
| 6,512,838 B1 | 1/2003 | Rafii et al. |
| 6,514,081 B1 | 2/2003 | Mengoli |
| 6,525,827 B2 | 2/2003 | Liu |
| 6,539,931 B2 | 4/2003 | Trajkovic et al. |
| 6,570,555 B1 | 5/2003 | Prevost et al. |
| 6,591,236 B2 | 7/2003 | Lewis et al. |
| 6,594,616 B2 | 7/2003 | Zhang et al. |
| 6,615,177 B1 | 9/2003 | Rapp et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,674,877 B1 | 1/2004 | Jojic et al. |
| 6,681,031 B2 | 1/2004 | Cohen et al. |
| 6,714,665 B1 | 3/2004 | Hanna et al. |
| 6,730,913 B2 | 5/2004 | Remillard et al. |
| 6,731,799 B1 | 5/2004 | Sun et al. |
| 6,738,066 B1 | 5/2004 | Nguyen |
| 6,750,848 B1 | 6/2004 | Pryor |
| 6,765,726 B2 | 7/2004 | French et al. |
| 6,771,277 B2 | 8/2004 | Ohba |
| 6,778,171 B1 | 8/2004 | Kikinis |
| 6,788,809 B1 | 9/2004 | Grzeszczuk et al. |
| 6,801,637 B2 | 10/2004 | Voronka et al. |
| 6,856,827 B2 | 2/2005 | Seeley et al. |
| 6,868,383 B1 | 3/2005 | Bangalore et al. |
| 6,873,723 B1 | 3/2005 | Aucsmith et al. |
| 6,876,496 B2 | 4/2005 | French et al. |
| 6,881,526 B2 | 4/2005 | Bobeck et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,006,236 B2 | 2/2006 | Tomasi et al. |
| 7,007,236 B2 | 2/2006 | Dempski et al. |
| 7,028,001 B1 | 4/2006 | Muthuswamy et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,042,442 B1 | 5/2006 | Kanevsky et al. |
| 7,050,177 B2 | 5/2006 | Tomasi et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,096,454 B2 | 8/2006 | Damm et al. |
| 7,113,918 B1 | 9/2006 | Ahmad et al. |
| 7,120,880 B1 | 10/2006 | Dryer et al. |
| 7,121,946 B2 | 10/2006 | Paul et al. |
| 7,134,130 B1 | 11/2006 | Thomas |
| 7,145,330 B2 | 12/2006 | Xiao |
| 7,151,530 B2 | 12/2006 | Roeber et al. |

(56) References Cited

U.S. PATENT DOCUMENTS

| | | |
|---|---|---|
| 7,155,305 B2 | 12/2006 | Hayes et al. |
| 7,162,082 B2 | 1/2007 | Edwards |
| 7,170,492 B2 | 1/2007 | Bell |
| 7,170,605 B2 | 1/2007 | Cromwell et al. |
| 7,184,048 B2 | 2/2007 | Hunter |
| 7,202,898 B1 | 4/2007 | Braun et al. |
| 7,212,665 B2 | 5/2007 | Yang et al |
| 7,214,932 B2 | 5/2007 | Brunfeld et al. |
| 7,217,020 B2 | 5/2007 | Finch |
| 7,222,078 B2 | 5/2007 | Abelow |
| 7,224,384 B1 | 5/2007 | Iddan et al. |
| 7,227,526 B2 | 6/2007 | Hildreth et al. |
| 7,259,747 B2 | 8/2007 | Bell |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,435,941 B2 | 10/2008 | Ayres |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,487,375 B2 | 2/2009 | Lourie et al. |
| 7,489,812 B2 | 2/2009 | Fox et al. |
| 7,512,889 B2 | 3/2009 | Newell et al. |
| 7,536,032 B2 | 5/2009 | Bell |
| 7,555,142 B2 | 6/2009 | Hildreth et al. |
| 7,559,841 B2 | 7/2009 | Hashimoto |
| 7,560,701 B2 | 7/2009 | Oggier et al. |
| 7,568,116 B2 | 7/2009 | Dooley et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,627,139 B2 | 12/2009 | Marks et al. |
| 7,636,456 B2 | 12/2009 | Collins et al. |
| 7,640,304 B1 | 12/2009 | Goldscheider |
| 7,643,056 B2 | 1/2010 | Silsby |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,739,140 B2 | 6/2010 | Vinson et al. |
| 7,746,345 B2 | 6/2010 | Hunter |
| 7,760,182 B2 | 7/2010 | Ahmad et al. |
| 7,764,311 B2 | 7/2010 | Bill |
| 7,770,136 B2 * | 8/2010 | Beeck et al. ................. 715/863 |
| 7,809,167 B2 | 10/2010 | Bell |
| 7,814,518 B2 | 10/2010 | Ducheneaut et al. |
| 7,834,846 B1 | 11/2010 | Bell |
| 7,836,480 B1 | 11/2010 | Harvey et al. |
| 7,852,262 B2 | 12/2010 | Namineni et al. |
| 7,889,073 B2 | 2/2011 | Zalewski |
| 7,895,076 B2 | 2/2011 | Kutaragi et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,081,302 B2 | 12/2011 | Paluszek et al. |
| 8,189,053 B2 | 5/2012 | Pryor |
| 8,418,085 B2 | 4/2013 | Snook et al. |
| 8,471,868 B1 | 6/2013 | Wilson et al. |
| 2002/0041327 A1 | 4/2002 | Hildreth et al. |
| 2002/0073417 A1 | 6/2002 | Kondo et al. |
| 2002/0120925 A1 | 8/2002 | Logan |
| 2002/0144259 A1 | 10/2002 | Gutta et al. |
| 2002/0174445 A1 | 11/2002 | Miller et al. |
| 2003/0001846 A1 | 1/2003 | Davis et al. |
| 2003/0005439 A1 | 1/2003 | Rovira |
| 2003/0007018 A1 * | 1/2003 | Seni et al. ................. 345/864 |
| 2003/0033600 A1 | 2/2003 | Cliff et al. |
| 2003/0093784 A1 | 5/2003 | Dimitrova et al. |
| 2003/0118974 A1 | 6/2003 | Obrador |
| 2003/0141360 A1 | 7/2003 | De Leo et al. |
| 2004/0001616 A1 | 1/2004 | Gutta et al. |
| 2004/0046736 A1 | 3/2004 | Pryor et al. |
| 2004/0056907 A1 | 3/2004 | Sharma et al. |
| 2004/0068409 A1 | 4/2004 | Tanaka et al. |
| 2004/0070573 A1 | 4/2004 | Graham |
| 2004/0113933 A1 | 6/2004 | Guler |
| 2004/0155962 A1 | 8/2004 | Marks |
| 2004/0168190 A1 | 8/2004 | Saari et al. |
| 2004/0189720 A1 | 9/2004 | Wilson et al. |
| 2004/0193413 A1 | 9/2004 | Wilson et al. |
| 2004/0207597 A1 | 10/2004 | Marks |
| 2005/0059488 A1 | 3/2005 | Larsen et al. |
| 2005/0082480 A1 | 4/2005 | Wagner et al. |
| 2005/0190973 A1 | 9/2005 | Kristensson et al. |
| 2005/0212767 A1 | 9/2005 | Marvit et al. |
| 2005/0215319 A1 | 9/2005 | Rigopulos et al. |
| 2005/0223237 A1 | 10/2005 | Barletta et al. |
| 2005/0229199 A1 | 10/2005 | Yabe |
| 2005/0234998 A1 | 10/2005 | Lesandrini et al. |
| 2005/0289582 A1 | 12/2005 | Tavares et al. |
| 2006/0031776 A1 | 2/2006 | Glein et al. |
| 2006/0031786 A1 | 2/2006 | Hillis et al. |
| 2006/0055685 A1 | 3/2006 | Rimas-Ribikauskas et al. |
| 2006/0073816 A1 * | 4/2006 | Kim et al. ................. 455/414.1 |
| 2006/0101349 A1 | 5/2006 | Lieberman et al. |
| 2006/0123360 A1 | 6/2006 | Anwar et al. |
| 2006/0174313 A1 | 8/2006 | Ducheneaut et al. |
| 2006/0188144 A1 | 8/2006 | Sasaki et al. |
| 2006/0188234 A1 | 8/2006 | Takeshita |
| 2006/0210958 A1 | 9/2006 | Rimas-Ribikauskas et al. |
| 2006/0218573 A1 | 9/2006 | Proebstel |
| 2006/0239558 A1 | 10/2006 | Rafii et al. |
| 2006/0253793 A1 | 11/2006 | Zhai et al. |
| 2006/0262116 A1 | 11/2006 | Moshiri et al. |
| 2006/0282856 A1 | 12/2006 | Errico et al. |
| 2007/0013718 A1 | 1/2007 | Ohba |
| 2007/0060336 A1 | 3/2007 | Marks et al. |
| 2007/0075978 A1 | 4/2007 | Chung |
| 2007/0098222 A1 | 5/2007 | Porter et al. |
| 2007/0143715 A1 | 6/2007 | Hollins et al. |
| 2007/0143787 A1 | 6/2007 | Cankaya |
| 2007/0150281 A1 | 6/2007 | Hoff |
| 2007/0150916 A1 | 6/2007 | Begole et al. |
| 2007/0214292 A1 | 9/2007 | Hayes et al. |
| 2007/0216894 A1 | 9/2007 | Garcia et al. |
| 2007/0219430 A1 | 9/2007 | Moore |
| 2007/0260984 A1 | 11/2007 | Marks et al. |
| 2007/0271580 A1 | 11/2007 | Tischer et al. |
| 2007/0279485 A1 | 12/2007 | Ohba et al. |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0016544 A1 | 1/2008 | Lee et al. |
| 2008/0018591 A1 | 1/2008 | Pittel et al. |
| 2008/0026838 A1 | 1/2008 | Dunstan et al. |
| 2008/0027984 A1 | 1/2008 | Perdomo |
| 2008/0033790 A1 | 2/2008 | Nickerson et al. |
| 2008/0059578 A1 * | 3/2008 | Albertson et al. ................. 709/204 |
| 2008/0062257 A1 | 3/2008 | Corson |

(56) References Cited

U.S. PATENT DOCUMENTS

| | | |
|---|---|---|
| 2008/0081694 A1 | 4/2008 | Hong et al. |
| 2008/0091512 A1 | 4/2008 | Marci et al. |
| 2008/0100620 A1 | 5/2008 | Nagai et al. |
| 2008/0100825 A1 | 5/2008 | Zalewski |
| 2008/0124690 A1 | 5/2008 | Redlich |
| 2008/0126937 A1 | 5/2008 | Pachet |
| 2008/0134102 A1 | 6/2008 | Movold et al. |
| 2008/0151113 A1 | 6/2008 | Park |
| 2008/0152191 A1 | 6/2008 | Fujimura et al. |
| 2008/0163130 A1 | 7/2008 | Westerman |
| 2008/0163283 A1 | 7/2008 | Tan et al. |
| 2008/0178126 A1 | 7/2008 | Beeck |
| 2008/0215972 A1 | 9/2008 | Zalewski et al. |
| 2008/0215973 A1 | 9/2008 | Zalewski et al. |
| 2008/0234023 A1 | 9/2008 | Mullahkhel et al. |
| 2009/0013366 A1 | 1/2009 | You et al. |
| 2009/0025024 A1 | 1/2009 | Beser et al. |
| 2009/0027337 A1 | 1/2009 | Hildreth |
| 2009/0037945 A1 | 2/2009 | Greig et al. |
| 2009/0051648 A1 | 2/2009 | Shamaie et al. |
| 2009/0070798 A1 | 3/2009 | Lee et al. |
| 2009/0072992 A1 | 3/2009 | Yun |
| 2009/0073136 A1 | 3/2009 | Choi |
| 2009/0085864 A1 | 4/2009 | Kutliroff et al. |
| 2009/0094627 A1 | 4/2009 | Lee et al. |
| 2009/0094629 A1 | 4/2009 | Lee et al. |
| 2009/0094630 A1 | 4/2009 | Brown |
| 2009/0106645 A1 | 4/2009 | Knobel |
| 2009/0112817 A1 | 4/2009 | Jung et al. |
| 2009/0116684 A1 | 5/2009 | Andreasson |
| 2009/0141933 A1 | 6/2009 | Wagg |
| 2009/0146775 A1 | 6/2009 | Bonnaud et al. |
| 2009/0157472 A1 | 6/2009 | Burazin et al. |
| 2009/0167679 A1 | 7/2009 | Klier et al. |
| 2009/0175540 A1 | 7/2009 | Dariush et al. |
| 2009/0178097 A1 | 7/2009 | Kim et al. |
| 2009/0183125 A1 | 7/2009 | Magal et al. |
| 2009/0195392 A1 | 8/2009 | Zalewski |
| 2009/0217315 A1 | 8/2009 | Malik et al. |
| 2009/0221368 A1 | 9/2009 | Yen et al. |
| 2009/0234718 A1 | 9/2009 | Green |
| 2009/0235195 A1 | 9/2009 | Shin |
| 2009/0251425 A1 | 10/2009 | Sohn et al. |
| 2009/0252423 A1 | 10/2009 | Zhu et al. |
| 2009/0296002 A1 | 12/2009 | Lida et al. |
| 2009/0303231 A1 | 12/2009 | Robinet et al. |
| 2010/0007801 A1 | 1/2010 | Cooper et al. |
| 2010/0026914 A1 | 2/2010 | Chung et al. |
| 2010/0033427 A1 | 2/2010 | Marks et al. |
| 2010/0070913 A1 | 3/2010 | Murrett et al. |
| 2010/0070987 A1 | 3/2010 | Amento et al. |
| 2010/0070992 A1 | 3/2010 | Morris et al. |
| 2010/0073329 A1 | 3/2010 | Raman et al. |
| 2010/0083373 A1 | 4/2010 | White et al. |
| 2010/0086204 A1 | 4/2010 | Lessing |
| 2010/0093435 A1 | 4/2010 | Glaser et al. |
| 2010/0095206 A1 | 4/2010 | Kim |
| 2010/0107184 A1 | 4/2010 | Shintani |
| 2010/0138797 A1 | 6/2010 | Thorn |
| 2010/0146389 A1 | 6/2010 | Yoo et al. |
| 2010/0151946 A1 | 6/2010 | Wilson et al. |
| 2010/0153984 A1 | 6/2010 | Neufeld |
| 2010/0169905 A1 | 7/2010 | Fukuchi et al. |
| 2010/0207874 A1 | 8/2010 | Yuxin et al. |
| 2010/0211439 A1 | 8/2010 | Marci et al. |
| 2010/0235667 A1* | 9/2010 | Mucignat et al. ............. 713/323 |
| 2010/0248832 A1 | 9/2010 | Esaki et al. |
| 2010/0251280 A1 | 9/2010 | Sofos et al. |
| 2010/0251300 A1 | 9/2010 | Fahey et al. |
| 2010/0278393 A1 | 11/2010 | Snook et al. |
| 2010/0286983 A1 | 11/2010 | Cho |
| 2010/0295783 A1 | 11/2010 | El Dokor et al. |
| 2010/0306712 A1 | 12/2010 | Snook et al. |
| 2010/0332842 A1 | 12/2010 | Kalaboukis et al. |
| 2011/0007142 A1 | 1/2011 | Perez et al. |
| 2011/0016102 A1 | 1/2011 | Hawthorne et al. |
| 2011/0037866 A1 | 2/2011 | Iwamoto |
| 2011/0038547 A1 | 2/2011 | Hill |
| 2011/0066682 A1 | 3/2011 | Aldunate et al. |
| 2011/0072448 A1 | 3/2011 | Stiers et al. |
| 2011/0077513 A1 | 3/2011 | Rofougaran |
| 2011/0085705 A1 | 4/2011 | Izadi et al. |
| 2011/0145040 A1 | 6/2011 | Zahn et al. |
| 2011/0145041 A1 | 6/2011 | Salamatov et al. |
| 2011/0164143 A1* | 7/2011 | Shintani et al. ............. 348/222.1 |
| 2011/0208582 A1 | 8/2011 | Hoyle |
| 2011/0214141 A1 | 9/2011 | Oyaizu |
| 2011/0246572 A1 | 10/2011 | Kollenkark et al. |
| 2011/0263946 A1 | 10/2011 | el Kaliouby et al. |
| 2011/0264531 A1 | 10/2011 | Bhatia et al. |
| 2011/0321096 A1 | 12/2011 | Landow et al. |
| 2012/0051719 A1 | 3/2012 | Marvit |
| 2012/0060176 A1 | 3/2012 | Chai et al. |
| 2012/0084812 A1 | 4/2012 | Thompson et al. |
| 2012/0109726 A1 | 5/2012 | Ruffini |
| 2012/0124603 A1 | 5/2012 | Amada |
| 2012/0192233 A1 | 7/2012 | Wong |
| 2012/0209715 A1 | 8/2012 | Lotan et al. |
| 2012/0226981 A1 | 9/2012 | Clavin |
| 2012/0268362 A1 | 10/2012 | Yee |
| 2012/0280897 A1 | 11/2012 | Balan et al. |
| 2012/0304059 A1 | 11/2012 | McCloskey |
| 2012/0306734 A1 | 12/2012 | Kim et al. |
| 2013/0014144 A1 | 1/2013 | Bhatia et al. |
| 2013/0054652 A1 | 2/2013 | Antonelli et al. |
| 2013/0136358 A1 | 5/2013 | Dedhia et al. |
| 2013/0145385 A1 | 6/2013 | Aghajanyan |
| 2013/0159555 A1 | 6/2013 | Rosser |
| 2013/0198690 A1 | 8/2013 | Barsoum et al. |
| 2013/0232515 A1 | 9/2013 | Rivera et al. |
| 2013/0268954 A1 | 10/2013 | Hulten |
| 2013/0268955 A1 | 10/2013 | Conrad |
| 2013/0298146 A1 | 11/2013 | Conrad |
| 2013/0298158 A1 | 11/2013 | Conrad |

FOREIGN PATENT DOCUMENTS

| | | |
|---|---|---|
| CN | 101202994 | 6/2008 |
| CN | 101254344 | 6/2010 |
| EP | 0583061 | 2/1994 |
| GB | 2423808 | 6/2006 |
| GB | 2459707 | 11/2009 |
| JP | 08044490 | 2/1996 |
| WO | WO-9310708 | 6/1993 |
| WO | WO-9717598 | 5/1997 |
| WO | WO-9915863 | 4/1999 |
| WO | WO-9944698 | 9/1999 |
| WO | WO-0159975 | 8/2001 |
| WO | WO-0169799 | 9/2001 |
| WO | WO-02082249 | 10/2002 |
| WO | WO-03001722 | 1/2003 |
| WO | WO-03015056 | 2/2003 |
| WO | WO-03046706 | 6/2003 |
| WO | WO-03054683 | 7/2003 |
| WO | WO-03073359 | 9/2003 |
| WO | WO-2009059065 | 5/2009 |
| WO | WO-03071410 | 8/2010 |

OTHER PUBLICATIONS

"Foreign Office Action", Canadian Application No. 2775814, (Aug. 24, 2012), 3 pages.

"Affdex: Measuring Emotion over the Web", *Affectiva*, Retrieved from: <http//www.affectiva.com/affdex/> Nov. 4, 2011, 3 pages.

"Future Media Internet Research Challenges and the Road Ahead", *European Commission Information Society and Media*, Available at <http://www.gatv.ssr.upm.es/nextmedia/images/fmi-tf-white_paper_042010.pdf>,(Apr. 2010), 31 pages.

Le, Nguyen T., "EmuPlayer: Music Recommendation System Based on User Emotion Using Vital-sensor", *Thesis, Keio University*, Available at <http://www.sfc.wide.ad.jp/theses/2011/files/sunny-publish-thesis-pdf>,(2010), 85 pages.

(56) References Cited

OTHER PUBLICATIONS

Minge, Michael "Dynamics of User Experience", *Workshop on Research Goals and Strategies for Studying User Experience and Emotion*, Available at <http://www.cs.uta.fi/~ux-emotion/submissions/Minge.pdf>,(2008), pp. 1-5

Pavlou, Paul A., et al., "Measuring the Effects and Effectiveness of Interactive Advertising: A Research Agenda", *Journal of Interactive Advertising*, vol. 1, No. 1 (Fall 2000), Available at <http://scholar.google.co.in/scholar_url?hl=en&q=http://jiad.org/download%3Fp%3D6&sa=X&scisig=AAGBfm3He5PA4sgMGDXTyQuqaVQn4Q3bZw&oi=scholarr>,(Oct. 2000), pp. 62-78.

Tep, S. P., et al., "Web Site Quality Evaluation Combining Eyetracking and Physiologicial Measures to Self-Reported Emotions: An Exploratory Research", *Proceedings of Measuring Behavior 2008* (Maastricht, The Netherlands, Aug. 26-29, 2008), Retrieved from: <http://www.noldus.com/mb2008/individual_papers/FPS_eye_tracking/FPS_eye_tracking_Prom-Tep.pdf> on Oct. 4, 2011,(Aug. 26, 2008), pp. 224-225.

Todd, Paul "Google Campaign Insights: Better Measurement for Display Advertising", Retrieved from: <http://adwordsagency.blogspot.com/2009/10/campaign-insights-better-measurement.html> on Nov. 14, 2011,(Oct. 19, 2009), 3 pages.

"Foreign Notice of Allowance", Canadian Application No. 2775700, (Jan. 3, 2013), 1 page.

"Foreign Office Action", Canadian Application No. 2775814, (Dec. 14, 2012), 3 pages.

"International Search Report and Written Opinion", Application No. PCT/US2012/034641, (Nov. 30, 2012), 9 pages.

"Non-Final Office Action", U.S. Appl. No. 12/794,406, (Sep. 14, 2012),17 pages.

"Non-Final Office Action", U.S. Appl. No. 13/316,351, (Feb. 14, 2013),16 pages.

"Non-Final Office Action", U.S. Appl. No. 13/439,284, (Feb. 25, 2013), 31 pages.

"Notice of Allowance", U.S. Appl. No. 12/474,453, (Dec. 12, 2012), 8 pages.

"Final Office Action", U.S. Appl. No. 12/794,406, (Apr. 22, 2013),14 pages.

"Response to Non-Final Office Action", U.S. Appl. No. 12/794,406, (Feb. 14, 2013),12 pages.

"Non-Final Office Action", U.S. Appl. No. 13/093,621, (Jun. 20, 2013), 7 pages.

"Foreign Office Action", European Patent Application No. 12195349.1, (May 10, 2013).

"PCT Search Report and Written Opinion", Application No. PCT/US2013/035047, (Jul. 5, 2013),10 pages.

"Non-Final Office Action", U.S. Appl. No. 13/363,689, (Jul. 26, 2013),18 pages.

"Final Office Action", U.S. Appl. No. 13/316,351, (Jul. 31, 2013), 20 pages.

"European Search Report", European Patent Application No. 12195349.1, (Apr. 22, 2013),3 pages.

"Final Office Action", U.S. Appl. No. 13/439,284, (Jun. 3, 2013),27 pages.

"Foreign Office Action", European Patent Application No. 12194891.3, (Apr. 24, 2013),5 pages.

"Non-Final Office Action", U.S. Appl. No. 13/025,180, (Apr. 5, 2013),17 pages.

"Non-Final Office Action", U.S. Appl. No. 13/441,228, (Mar. 20, 2013),12 pages.

"Non-Final Office Action", U.S. Appl. No. 13/488,046, (Jun. 13, 2013),8 pages.

"Recognizing Visual Focus of Attention from Head Pose in Natural Meetings", *IEEE Transactions on Systems, Man, and Cybernetics, Part B: Cybernetics- Speicial Issue on Human Computing*, vol. 39, Issue 1, (Feb. 2009),36 pages.

"Restriction Requirement", U.S. Appl. No. 13/488,046, (May 2, 2013),5 pages.

"Supplementary European Search Report", European Patent Applicaton No. 12194891.3, (Apr. 4, 2013),3 pages.

Asteriadis, Stylianos et al., "Estimation of Behavioral User State based on Eye Gaze and Head Pose—Application in an e-Learning Environment", *Journal of Multimedia Tools and Application*, vol. 41, Issue 3, (Feb. 2009),25 pages.

Ba, Sileye O., et al., "Head Pose Tracking and Focus of Attention Recognition Algorithms in Meeting Rooms", *Proceedings of the 1st International Evaluation Conference on Classification of Events, Activities and Relationships*, (Apr. 6, 2006), 12 pages.

Boser, Bernhard E., et al., "A Training Algorithm for Optimal Margin Classifiers", *Proceedings of the Fifth Annual Workshop on Computational Learning Theory*, (Jul. 27, 1992),9 pages.

Bradley, Margaret M., et al., "Measuring Emotion: The Self-Assessment Manikin and the Semantic Differential", *In Journal of Behavior Therapy and Experimental Psychiatry*, vol. 25, Issue 1, (Mar. 1994),11 pages.

Chang, Chih-Chung et al., "LIBSVM: A Library for Support Vector Machines", retrieved from <http://www.csie.ntu.edu.tw/~cjlin/libsvm/> on Apr. 1, 2013, 4 pages.

El Kaliouby, Rana et al., "Real Time Inference of Complex Mental States from Facial Expressions and Head Gestures", *Proceedings of Conference on Computer Vision and Pattern Recognition Workshop*, (Jun. 27, 2004),20 pages.

Grace, Richard et al., "A Drowsy Driver Detection System for Heavy Vehicles", *Proceedings of the 17th Digital Avionics Systems Conference*, vol. 2, (Oct. 31, 1998),8 pages.

Guyon, Isabelle et al., "An Introduction to Variable and Feature Selection", *In Journal of Machine Learning Research*, vol. 3, (Mar. 2003),pp. 1157-1182.

Kapoor, Ashish et al., "Multimodal Affect Recognition in Learning Environments", *Proceedings of the 13th Annual ACM International Conference on Multimedia*, (Nov. 6, 2005),6 pages.

Liang, Lin et al., "Face Alignment via Component-Based Discriminative Search", *Computer Vision, ECCV 2008, Lecture Notes in Computer Science* vol. 5303, (2008),14 pages.

McDuff, Daniel "Affective Storytelling: Automatic Measurement of Story Effectiveness from Emotional Responses Collected over the Internet", *PhD Thesis*, retrieved from <http://web.media.mil.edu/~djmcduff/documents/McDuff_Thesis_Proposal.pdf> pdf<<,(Jun. 6, 2012),16 pages.

McDuff, Daniel et al., "Crowdsourcing Facial Responses to Online Videos", *Proceedings of the IEEE Transactions on Affective Computing*, vol. 3, Issue 4,(Oct. 2012),pp. 456-468.

McDuff, et al., "AffectAura: An Intelligent System for Emotional Memory", *In Proceedings of the SIGCHI Conference on Human Factors in Computing Systems*, Retrieved from <http://www.affectiva.com/assets/Q-Sensor-Microsoft-Publication.pdf>,(May 5, 2012),10 pages.

OP Den Akker, Rieks et al., "Supporting Engagement and Floor Control in Hybrid Meetings", *In Cross-Modal Analysis of Speech, Gestures, Gaze and Facial Expressions*, (Jul. 2009),15 pages.

Peacock, James et al., "Which Broadcast Medium Better Drives Engagement? Measuring the Powers of Radio and Television with Electromyography and Skin-Conductance Measurements", *In Journal of Advertising Research*, vol. 51, Issue 4, (Dec. 2011),8 pages.

Poels, Karolien et al., "How to Capture the Heart? Reviewing 20 Years of Emotion Measurement in Advertising", *In the Journal of Advertising Research*, vol. 46, Issue 1, (Mar. 2006),48 pages.

Viola, Paul et al., "Robust Real-Time Face Detection", *In International Journal of Computer Vision*, vol. 57, Issue 2, (May 2004),18 pages.

Voit, Michael et al., "Deducing the Visual Focus of Attention from Head Pose Estimation in Dynamic Multi-View Meeting Scenarios", *Proceedings of the 1oth International Confererence on Multimodal Interfaces*, (Oct. 20, 2008),8 pages.

Wedel, Michel et al., "Eye Fixations on Advertisements and Memory for Brands: A Model and Finding", *Journal of Marketing Science*, vol. 19, Issue 4, (Oct. 2000),pp. 297-312.

Wood, Orlando "Using Faces: Measuring Emotional Engagement for Early Stage Creative", *In ESOMAR, Best Methodology, Annual Congress*, (Sep. 19, 2007),29 pages.

(56) References Cited

OTHER PUBLICATIONS

Zhang, Zhenqiu et al., "Head Pose Estimation in Seminar Room Using Multi View Face Detectors", *Proceedings of the 1st International Evaluation Conference on Classification of Events, Activities and Relationships*, (Mar. 20, 2006),7 pages.
"Advisory Action", U.S. Appl. No. 10/396,653, (May 2, 2007), 3 pages.
"Advisory Action", U.S. Appl. No. 10/396,653, (May 23, 2008), 3 pages.
"Application Titled "Controlling Electronic Devices in a Multimedia System Through a Natural User Interface"", U.S. Appl. No. 13/038,024, filed Mar. 2, 2011, pp. 1-46.
"Application Titled "Interaction with Networked Screen Content Via Motion Sensing Device in Retail Settling"", U.S. Appl. No. 13/025,180, filed Feb. 11, 2011, pp. 1-23.
"Commanding Overview", *MSDN*, retrieved from <http://msdn.microsoft.com/en-us/library/ms752308.aspx> on Sep. 27, 2011, 11 pages.
"Designing CEC into your next HDMI Product", *Quantum Data White Paper*, Retrieved from the Internet:<URL:http://www.quantumdata.com/pdf/CEC_white_paper.pdf> *Quantum Data, Inc.*, Elgin, IL, USA, (May 13, 2006), 12 pages.
"Final Office Action", U.S. Appl. No. 10/396,653, (Feb. 20, 2009), 12 pages.
"Final Office Action", U.S. Appl. No. 10/396,653, (Feb. 25, 2008), 20 pages.
"Final Office Action", U.S. Appl. No. 10/396,653, (Feb. 26, 2007), 18 pages.
"Final Office Action", U.S. Appl. No. 11/626,794, (Jun. 11, 2009), 14 pages.
"Final Office Action", U.S. Appl. No. 12/474,453, (May 10, 2012), 14 pages.
"GWindows: Light-Weight Stereo Vision for Interaction", http://research.microsoft.com/~nuria/gwindows/htm, (Jul. 8, 2005), 2 pages.
"International Search Report", PCT Application No. PCT/US2010/036005, (Dec. 24, 2010), 3 pages.
"KinEmote uses Kinect to translate key strokes for Windows applications", techshout.com [online], Retrieved from the Internet:<URL:http://www.techshout.com/gaming/2010/28/kinemote-uses-kinect-to-translate-key-strokes-for-windows-applications/>,(Dec. 28, 2010), 2 pages.
"Non-Final Office Action", U.S. Appl. No. 10/396,653, (Sep. 6, 2007), 17 pages.
"Non-Final Office Action", U.S. Appl. No. 10/396,653, (Sep. 8, 2008), 13 pages.
"Non-Final Office Action", U.S. Appl. No. 10/396,653, (Sep. 19, 2006), 24 pages.
"Non-Final Office Action", U.S. Appl. No. 11/626,794, (Oct. 27, 2009), 15 pages.
"Non-Final Office Action", U.S. Appl. No. 11/626,794, (Dec. 23, 2008), 18 pages.
"Non-Final Office Action", U.S. Appl. No. 12/474,453, (Sep. 6, 2011), 10 pages.
"Notice of Allowance", U.S. Appl. No. 10/396,653, (Nov. 19, 2009), 7 pages.
"Notice of Allowance", U.S. Appl. No. 11/626,794, (May 13, 2010), 4 pages.
"Signal Processing Institute", http://Itswww.epfl.ch/~alahi/student_projects/proposals.shtml#4, Downloaded Feb. 2, 2009, 4 pages.
"Simulation and Training", Division Incorporated,(1994), 6 Pages.
"The Case for Kinect", *Eurogamer* [online] Retrieved from the Internet on Aug. 20, 2010: URL:<http://www.eurogamer.net/articles/digitalfoundry-the-case-for-kinect-article?page=2>., (Aug. 7, 2010), pp. 1-7.
U.S. Appl. No. 12/794,406, filed Jun. 4, 2010, 37 pages.
"Virtual High Anxiety", *Tech update*, (Aug. 1995), 1 Page.
Agarwal, Ankur et al., "High Precision Multi-touch Sensing on Surfaces using Overhead Cameras", *Second Annual IEEE International Workshop on Horizontal Interactive Human-Computer System*, available at <<http://ieeexplore.ieee.org/stamp/stamp.jsp?tp=&arnumber=4384130>>,(Nov. 19, 2007), 4 pages.
Aggarwal, et al., "Human Motion Analysis: A Review", *IEEE Nonrigid and Articulated motion Workshop*, University of Texas at Austin, Austin, TX.,(1997), pp. 90-102.
Ali, Azarbayejani et al., "Real-Time Self-Calibrating Stereo Person Tracking Using 3-D Shape Estimation from Blob Features", *Proceedings of ICPR*, Vienna, Austria, (Aug. 1996), pp. 627-632.
Althoff, Frank et al., "Using Multimodal Interaction to Navigate in Arbitrary Virtual VRML Worlds", *PUI 2001* Orlando, FL USA, available at <http://citeseerx.ist.psu.edu/viewdoc/download?doi=10.1.1.16.8064&rep=rep1&type=pdf>, (2001), 8 pages.
Argyros, et al., "Vision-Based Interpretation of Hand Gestures for Remote Control of a Computer Mouse", Retrieved from: <http://www.ics.forth.gr/~argyros/mypapers/2006_05_hci_virtualmouse.pdf> on Oct. 31, 2007, (2006), pp. 40-51.
Azarbayejani, et al., "Visually Controlled Graphics", *IEEE Transactions on Pattern Analysis and Machine Intelligence*, vol. 15, No. 6, (Jun. 1993), pp. 602-605.
Azoz, Yusuf et al., "Reliable Tracking of Human Arm Dynamics by Multiple Cue Integration and Constraint Fusion", *IEEE Conference on Computer Vision and Pattern Recognition*, (1998), 6 pages.
Baudel, Thomas et al., "Charade: Remote Control of Objects using Free-Hand Gestures", *Communications of the ACM*, vol. 36. No. 7, (Jul. 1993), 10 pages.
Becker, David A., "Sensei: A Real-Time Recognition, Feedback and Training System for T'ai Chi Gestures", http://citeseer.ist.psu.edu/cache/papers/cs/405/ftp:zSzzSzwhitechapel.media.mit.eduzSzpubzSztech-reportersSzTR-426pdf/becker97sensei.pdf. (Jun. 1993), 50 pages.
Berard, Francois "The Perceptual Window-Head Motion as a New Input Stream", *Proceedings of the Seventh IFIP Conference of Human-Computer Interaction*, (1999), 238-244.
Bhuiyan, Moniruzzaman et al., "Gesture-controlled user interfaces, what have we done and what's next?", Retrieved at <<http://www.newi.ac.uk/computing/research/pubs/SEIN_BP.pdf>>, (Nov. 27, 2009), 10 pages.
Bobic, Nick "Rotating Objects Using Quaternions", Retrieved from the Internet on Aug. 20, 2010: URL http://www.gamasutra.com/view/feature/3278/rotating_objects_quarternions.php?page=2>., (Jul. 5, 1998), 14 pages.
Boverie, S. et al., "Comparison of Structured Light and Stereovision Sensors for New Airbag Generations", *Control Engineering Practice* vol. 11, Issue 12 (2003), available at <<http://homepages.laas.fr/lerasle/pdf/cep03.pdf>>, (Dec. 2003), pp. 1413-1421.
Bowman, Doug A., et al., "New Directions in 3D User Interfaces", *The International Journal of Virtual Reality*, retrieved from <http://citeseerx.ist.psu.edu/viewdoc/download?doi=10.1.1.99.1121&rep=rep1&type=pdf> on Nov. 15, 2011),(2006), pp. 3-14.
Breen, David et al., "Interactive Occulusion and Collision of Real and Virtual Objects in Augmented Reality". *Technical report ECRC-95-02 European Computer-Industry Research Centre GmbH*, Munich, Germany, (1995), 22 Pages.
Brogan, David et al., "Dynamically Simulated Characters in Virtual Environments", vol. 18, Issue 5, IEEE Computer Graphics and Applications, (Sep./Oct. 1998), pp. 58-69.
Buxton, William et al., "A Study of Two-Handed Input", *Proceedings of CHI'86*, (1986), pp. 321-326.
Cedras, Claudette et al., "Motion-based Recognition: A Survey", *IEEE Proceedings, Image and Vision Computing*, vol. 13, No. 2, (Mar. 1995), pp. 129-155.
Crawford, Stephanie "How Microsoft Kinect Works". *Howstuffworks[online]*, Retrieved from the Internet on Aug. 19, 2010: URL: <http://electronics.howstuffworks.com/microsoft-kinect.htm/printable>., pp. 1-5.
Dalton, Angela B., et al., "Sensing User Intention and Context for Energy Management", *Duke University, Department of Computer Science*, Retrieved from the Internet:<URL:http://www.cs.duke/edu/ari/millywatt/faceoff.pdf>, (Feb. 23, 2003), 5 pages.
Darrell, T et al., "Integrated Person Tracking Using Stereo, Color and Pattern Detection", *Proceedings of the Conference on Computer Vision and Pattern Recognition*, (1998), pp. 601-609.

(56) References Cited

OTHER PUBLICATIONS

Fisher, et al., "Virtual Environment Display System", *ACM Workshop on Interactive 3D Graphics*, Chapel Hill, NC, (Oct. 1986), 12 Pages.

Fitzgerald, et al., "Integration of Kinematic Analysis into Computer Games for Exercise", *Proceedings of CGames 2006—9th International Conference on Computer Games: AI, Animation, Mobile, Educational and Serious Games*, Dublin Ireland, (Nov. 2006), pp. 24-28.

Fitzgerald, Will et al., "Multimodal Event Parsing for Intelligent User Interfaces", *IUI Conference*, (Jan. 2003), 8 pages.

Freed, Natalie "Toys Keeping in Touch: Technologies for Distance Play", Retrieved from <<http://people.ischool.berkeley.edu/~daniela/tei2010/gsc09e-freed.pdf>>, (Jan. 24, 2010), 2 pages.

Freeman, William et al., "Television Control By Hand Gestures", *International Workshop on Automatic Face and Gesture Recognition*, (1995), pp. 179-183.

Gonzalez, Barb "HDMI CEC", *Home Theater University* [online] Retrieved from the Internet:<URL:http://www.hometheatre.com/hookmeup/208hook>, (Mar. 24, 2008),3 pages.

Granier, John P., et al., "Simulating Humans in VR", *The British Computer Society, Academic Press*, (Oct. 1994), 15 Pages.

Grunder, Alexander "UPDATED: Xbox 360 Kinect Hand Gesture Media Controls, Voice Control, TV Video Chat.", *eHomeUpgrade* [online] retrieved from the internet:<URL:http://www.ehomeupgrade.com/2010/06/14/updated-xbox-360-kinect-hand-gesture-media-controls-voice-control-tv-video-chat/>, (Jun. 14, 2010), 8 pages.

Guiard, Yves "Asymmetric Division of Labor in Human Skilled Bimanual Action: The Kinematic Chain as a Model", *Journal of Motor Behavior*, vol. 19 Issue 4, (1987), 486-517.

Guler, Sadiye Z., "Spli and Merge Behavior Analysis and Understanding Using Hidden Markov Models", (Oct. 8, 2002), 21 pages.

Hardin, Winn "Machine Vision Makes the Leap to Consumer Gaming", *Machine Vision Online*, retrieved from <<http://www.machinevisiononline.org/vision-resources-details.cfm?content_id=2398>> on Mar. 14, 2011,(Dec. 8, 2010), 3 pages.

Hasegawa, Shoichi et al., "Human-Scale Haptic Interaction with a Reactive Virtual Human in a Real-Time Physics Simulator", *ACM Computers in Entertainment*, vol. 4, No. 3, (Jul. 2006), 12 Pages.

He, Lei "Generation of Human Body Models", University of Auckland, New Zealand, (Apr. 2005), 111 Pages.

Hongo, Hitoshi et al., "Focus of Attention for Face and Hand Gesture Recognition Using Multiple Cameras", *4th IEEE International Conference on Automatic Face and Gesture Recognition*, Grenoble, France, (Mar. 2000), pp. 156-161.

Horvitz, Eric "Principles of Mixed-Initiative User Interfaces", *Proceedings of CHI*, (1999), 8 pages.

Horvitz, Eric et al., "A Computational Architecture for Conversation", *Proceedings of the Seventh International Conference on User Modeling*, (1999), pp. 201-210.

Hourcade, Juan P., "Architecture and Implementation of Java Package for Multiple Input Devices (MID)", *HCIL Technical Report No. 99-08* (May 1999); http://www.cs.umd.edu/hcil, (May 1999), 7 pages.

Isard, Michael et al., "CONDENSATION—Conditional Density Propagation for Visual Tracking", *International Journal of Computer Vision 29(1)*, Netherlands, (1998), pp. 5-28.

Jacko, "HDI Dune Prime 3.0 Part 2.", Retrieved from the internet: <URL:http://www.jacko.my/2010/06/hdi-dune-prime-30-part-2.html>, (Jun. 19, 2010), 15 pages.

Jojic, Nebojsa et al., "Detection and Estimation of Pointing Gestures in Dense Disparity Maps", *Proceedings of IEEE International Conference on Automatic Face and Gesture Recognition*, (2000), pp. 1000-1007.

Kabbash, P et al., "The Prince" Technique: Fitts' Law and Selection Using Area Cursors, *Proceedings of CHI'95*, http://www.billbuxton.com/prince.html, (1995), pp. 273-279.

Kanade, et al., "Development of Video-Rate Stereo Machine", *Proceedings of 94 ARPA Image Understanding Workshop*, (1994), pp. 549-558.

Kanade, Takeo et al., "A Stereo Machine for Video-rate Dense Depth Mapping and Its New Applications", *IEEE Computer Society Conference on Computer Vision and Pattern Recognition*, The Robotics Institute, Carnegie Mellon University, Pittsburgh, PA,(1996), pp. 196-202.

Kim, Song-Gook et al., "Multi-Touch Tabletop Interface Technique for HCI", retrieved from <<http://210.119.33.7/apis6/paper/data/63-multi-touch%20tabl.pdf>> on Mar. 16, 2011, 4 pages.

Kjeldsen, Frederik "Visual Interpretation of Hand Gestures as Practical Interface Modality", *Ph.D. Dissertation, Columbia University Department of Computer Science*, (1997), 168 pages.

Klompmaker, Florian "D5.—State of the art analysis and recommendations on 'Context Awareness', 'Human Computer Interaction' and 'Mobile Users Interfaces'", *Information Technology for European Advancement (ITEA), Local Mobile Services*, Retrieved from the Internet:<URL:http//www.loms-itea.org/deliverables/LOMS_D5.1_v1.0.pdy>, (Jul. 2, 2007), 55 pages.

Kohler, Marcus "Technical Details and Ergonomical Aspects of Gesture Recognition applied in Intelligent Home Environments", Germany, (1997), 35 Pages.

Kohler, Markus "Special Topics of Gesture Recognition Applied in Intelligent Home Environments", *In Proceedings of the Gesture Workshop*, Germany, (1998), 12 Pages.

Kohler, Markus "Vision Based Remote Control in Intelligent Home Environments", University of Erlangen-Nuremberg, Germany, (1996), 8 Pages.

Kolsch, Mathias et al., "Vision-Based Interfaces for Mobility", Retrieved from <<http://ieeexplore.ieee.org/stamp/stamp.jsp?tp=&arnumber=1331713>>, (Aug. 22, 2004), 9 pages.

Kwon, et al., "Combining Body Sensors and Visual Sensors for Motion Training", *Computer Graphics Laboratory*, http://graphics.ethz.ch/~dkwon/downloads/publications/ace05_ace.pdf, Downloaded 2009,(2005), pp. 1-8.

Latoschik, Marc E., "A User Interface Framework for Multimedia VR Interactions", *ICMI'05*, Trento, Italy, Oct. 4-6, 2005, available at <http://citeseerx.ist.psu.edu/viewdoc/download?doi=10.1.1.91.2941&rep=rep1&type=pdf>,(Oct. 4, 2005), 8 pages.

Leal, Anamary et al., "Initial Explorations into the User Experience of 3D File Browsing", *Proceedings of HCI 2009*, retrieved from <http://www.eecs.ucf.edu/isuelab/publications/pubs/p339-leal-3dfiles.pdf> on Nov. 15, 2011,(Sep. 2009), pp. 339-344.

Li, Stan Z., et al., "A Near-Infrared Image Based Face Recognition System", available at <<http://www.cbsr.ia.ac.cn/Li%20Group/papers/IR-Face-FG06.pdf>>,(Apr. 2006), 6 pages.

Livingston, Mark A., "Vision-based Tracking with Dynamic Structured Light for Video See-through Augmented Reality", TheUniversity of NorthCarolina at ChapelHill, North Carolina, USA, (1998), 145 Pages.

Long, Jr., Allan C., et al., "Implications for a Gesture Design Tool", *Proceedings of CHI'99*, (1999), pp. 40-47.

Maes, Pattie et al., "The ALIVE System: Wireless, Full-body, Interaction with Autonomous Agents", *ACM Multimedia Systems, Special Issue on Multimedia and Multisensory Virtual Worlds*, (Nov. 1995), 17 pages.

Maltby, John R., "Using Perspective in 3D File Management: Rotating Windows and Billboarded Icons", *Proceedings of the International Conference on Computer Graphics, Imaging and Visualisation (CGIV'06)*, available at <http://ieeexplore.ieee.org/stamp/stamp.jsp?tp=&arnumber=1663765>,(Jul. 28, 2006), 8 pages.

Martin, Benoit "VirHKey: A VIRtual Hyperbolic KEYboard with Gesture Interaction and Visual Feedback for Mobile Devices", http://delivery.acm.org/10.1145/1090000/1085794/p99-martin.pdf?key1=1085794&key2=4890534611&coll=portal&dl=ACM&CFID=11111111&CFTOKEN=2222222, (Sep. 2005), 8 pages.

McCrae, James et al., "Exploring the Design Space of Multispace 3D Orientation"*AVI'10*, retrieved from <http://www.autodeskresearch.com/pdf/avi2010-final.pdf> on Nov. 15, 2011,(May 2, 2010), 8 pages.

Mignot, Christopher et al., "An Experimental Study of Future 'Natural' Multimodal Human-Computer Interaction", *Proceedings of INTERCHI93*, (1993), pp. 67-68.

(56) References Cited

OTHER PUBLICATIONS

Millan, Maria S., et al., "Unsupervised Defect Segmentation of Patterned Materials under NIR Illumination", *Journal of Physic: Conference Series 274* (2011) 012044, available at <<http://iopscience.iop.org/1742-6596/2741/1/012044/pdf/1742-6596_274_1_012044.pdf>>,(2011), 9 pages.

Miyagawa, Ryohei et al., "CCD-Based Range-Finding Sensor", *IEEE Transactions on Electron Devices*, vol. 44, No. 10, (Oct. 1997), pp. 1648-1652.

Moeslund, Thomas B., et al., "A Survey of Computer Vision-Based Human Motion Capture", *Computer Vision and Image Understanding: CVIU*, vol. 81, No. 3, (2001), pp. 231-269.

Morency, Louis-Philippe et al., "Contextual Recognition of Head Gestures", Trento, Italy http://delivery.acm.org/10.1145/1090000/1088470/p18_morency.pdf?key1=1088470&key2=8870534611&coll=portal&dL=ACM&CFID=11111111&CFTOKEN=2222222, 7 pages, Oct. 4, 2005.

Morrison, Gerald D., "A Camera-Based Touch Interface for Pervasive Displays", Retrieved from <<http://ubicomp.algoritmi.uminho.pt/perdisplay/docs/Morrison-Camera%20Touch_SV_Rev1.pdf>> on Mar. 16, 2011, 7 pages.

Moscovich, Tomer "Multi-touch Interaction", Brown University, CHI 2006, Apr. 22-27, 2006, Montreal, Quebec, Canada, (Apr. 22, 2006). 4 pages.

Moyle, et al., "Gesture Navigation: An Alternative 'Back' for the Future", *Proceedings of CHI'02*, (2002), pp. 882-823.

Nielsen, Michael et al., "A Procedure for Developing Intuitive and Ergonomic Gesture Interfaces for Man-Machine Interaction", *Technical Report CVMT 03-01, ISSN 1601-3463. CVMT*, Aalborg University, (Mar. 2003), 12 pages.

Oh, Alice et al., "Evaluating Look-to-talk: A Gaze-Aware Interface in a Collaborative Environment", *CHI'02*, (2002), 650-651.

Oviatt, Sharon "Ten Myths of Multimodal Interaction", *Communications of the ACM*, vol. 42, No. 11, (Nov. 1999), 8 pages.

Paquit, Vincent et al., "Near-infrared Imaging and Structured Light Ranging for Automatid Catheter Insertion", *Proceedings of SPIE* vol. 6141, 61411T, (2006), available at <<http://www.cs.rpi.edu/~chakrn2/work/catheter_plan/paquit_06.pdf>>,(2006), 9 pages.

Parrish, Kevin "Microsoft Does Want Core Games, FPS for Kinect", *Tom's Guide: Tech for Real Life [online]*, Retrieved from the Internet on Aug. 20, 2010: URL: <http://www.tomsguide.com/us/Core-Gamers-Kinect-FPS-Action.news-7195.html>., (Jun. 23, 2010), 1 page.

Pavlovic, Vladimir et al., "Visual Interpretaton of Hand Gestures for Human-Computer Interaction: A Review", *IEEE Transactions on Pattern Analsis and Machine Intelligence*, vol. 19, No. 7, (Jul. 1997), pp. 677-695.

Qian, et al., "A Gesture-Driven Multimodal Interactive Dance System", *IEEE International Conference on Multimedia and Expo*, Taipei, (Jun. 2004), pp. 1579-1582.

Raymer, A "Gestures and Words: Facilitating Recovery in Aphasia", *The ASHA Leader*, http://www.asha.org/about/publications/leader-online/archives/2007/070619/f070619a.htm, (Jun. 19, 2007), 6 pages.

Rigoll, Gerhard et al., "High Performance Real-Time Gesture Recognition Using Hidden Markov Models", *Gesture and Sign Language in Human-Computer Interaction*, vol. LNAI 1371, Frohlich, ed., (1997), pp. 69-80.

Rosenhahn, Bodo et al., "Automatic Human Model Generation", University of Auckland (CITR), New Zealand, (2005), pp. 41-48.

Sakir, Samit "Kinect is your personal trainer in EA Sports Active 2", *Gamerss [online]* Retrieved from the Internet on Aug. 20, 2010: URL: <http://www.gamerss.co.uk/kinect-is-your-personal-trainer-in-ea-sports-active-2>. (Jul. 26, 2010), 4 pages.

Schick, Alexander et al., "Extending Touch: Towards Interaction with Large-Scale Surfaces", *ITS '09*, Nov. 23-25, 2009, Banff, Alberta, Canada, available at <<http://www.iosb.fraunhofer.de/servlet/is/33404/urn_nbn_de_0011-n-1159494.pdf>>,(Nov. 23, 2009), 8 pages.

Schielel, Seth "A Home System Leaves Hand Controls in the Dust, Kinect by Microsoft Keeps You Entertained Hands Free", *The New York Times* [online] Retrieved from the Internet:<URL:http://www.nytimes.com/2010/11/04/arts/television/04kinect.html>, (Nov. 4, 2010), 3 pages.

Shao, Jiang et al., "An Open System Architecture for a Multimedia and Multimodal User Interface", *Japanese Society for Rehabilitation of Persons with Disabilities (JSRPD)*, Japan, (Aug. 24, 1998), 8 Pages.

Sharma, et al., "Method of Visual and Acoustic Signal Co-Analysis for Co-Verbal Gesture Recognition", U.S. Appl. No. 60/413,998, (Sep. 19, 2002), 16 pages.

Sharma, Rajeev M., et al., "Speech-Gesture Driven Multimodal Interfaces for Crisis Management", *Proceedings of IEEE Special Issue on Multimodal Human-Computer Interface*, (2003), 28 pages.

Shen, Guobin et al., "Dita: Enabling Gesture-Based Human-Device Interaction using Mobile Phone", Retrieved at <<. (Oct. 1, 2010), pp. 1-14.

Sheridan, Thomas et al., "Virtual Reality Check", *Technology Review*, vol. 96, No. 7, (Oct. 1993), 9 Pages.

Shivappa, "Person Tracking with Audio-Visual Cues Using the Iterative Decoding Framework", *IEEE Fifth International Conference on Advanced Video and Signal Based Surveillance, AVSS 08*, Sante Fe, NM, (Sep. 2008), 260-267.

Simeone, Luca et al., "Toys++ AR Embodied Agents as Tools to Learn by Building", Retrieved from <<http://ieeexplore.ieee.org/stamp/stamp.jsp?arnumber=05572598>>, (Jul. 5, 2010), 2 pages.

Stevens, Jane "Fights into Virtual Reality Treating Real World Disorders", *The Washington Post, Science Psychology*, (Mar. 27, 1995), 2 Pages.

Tilley, Steve "E3 09: Project Natal exposed", Load This [online] Retrieved from the Internet<URL:http://blogs.canoe.ca/loadthis/general/e3-09-project-natal-exposed/>, (Jun. 1, 2009), 4 pages.

Toyama, Kentaro et al., "Probabilistic Tracking in a Metric Space", *Eighth International Conference on Computer Vision*, Vancouver Canada, vol. 2, (Jul. 2001), 8 pages.

Tresadern, Philip A., et al., "Visual Analysis of Articulated Motion", *DPhil Thesis*, University of Oxford, Oxford, U.K., (Oct. 12, 2006), 1-171.

Vaucelle, Cati et al., "Picture This! Film Assembly Using Toy Gestures", Retrieved from <<http://web.media.mit.edu/~cati/PictureThis_Ubicomp.pdf>>, (2008), 10 pages.

Walker, et al., "Age Related Differencies in Movement Control: Adjusting Submovement Structure to Optimize Performance", *Journals of Gerontology*, (Jan. 1997), pp. 40-52.

Welford, Alan T., "Signal, Noise, Performance, and Age.", *Human Factors*, vol. 23. Issue 1, http://www.ingentaconnect.com/content/hfes/hf/1981/00000023/00000001/art0009, (1981), pp. 97-109.

Wilson, Andrew et al., "GWindows: Towards Robust Perception-Based UI", *Microsoft Research*, (2003), pp. 1-8.

Wilson, et al., "Hidden Markov Models for Modeling and Recognizing Gesture Under Variation", *Hidden Markov Model: Applications in Computer Vision., T. Caelli, ed. World Scientific*, (2001), 36 pages.

Worden, Aileen et al., "Making Computers Easier for Older Adults to Use: Area Cursors and Sticky Icons", *CHI 97*, Atlanta Georgia, USA, (1997), pp. 266-271.

Wren, Christopher et al., "Pfinder: Real-Time Tracking of the Human Body", *IEEE Transactions on Pattern Analysis and Machine Intelligence*, vol. 19, No. 7, (Jul. 1997), pp. 780-785.

Yakut, Isil D., et al., "User and Task Analysis of Multi-Level 3D File Browser", *Dept. of Computer Engineering*, Bilkent University, Ankara, Turkey, retrieved from <http://www.cs.bilkent.edu.tr/~cansin/projects/cs560-3dui/multi-level-3d-file-browser/3dui-report.pdf> on Nov. 15, 2011, 4 pages.

Yoda, Ikushi et al., "Utilizatilon of Stereo Disparity and Optical Flow Information for Human Interaction", *Proceedings of the Sixth International Conference on Computer Vision, IEEE Computer Society*, Washington D.C., USA, (1998), 5 pages.

Zhai, Shumin et al., "The "Silk Cursor": Investigating Transparency for 3D Target Acquisition", *CHI 94*, (1994), pp. 273-279.

Zhang, Zhengyou "A Flexible New Technique for Camera Calibration", *IEEE Transactions on Pattern Analysis and Machine Intelligence*, vol. 22, No. 11, (Nov. 2000), pp. 1330-1334.

(56) References Cited

OTHER PUBLICATIONS

Zhang, Zhengyou "Flexible Camera Calibration by Viewing a Plane from Unknown Orientations", *Microsoft Research*, (1999), 8 pages.

Zhao, Liang "Dressed Human Modeling, Detection, and Parts Localization", *The Robotics Institute, Carnegie Mellon University*, Pittsburgh, PA, (2001), 121 Pages.

"Final Office Action", U.S. Appl. No. 13/441,228, (Sep. 11, 2013), 15 pages.

"Non-Final Office Action", U.S. Appl. No. 12/972,837, (Jun. 26, 2013), 10 pages.

"Notice of Allowance", U.S. Appl. No. 13/093,621, (Aug. 21, 2013), 7 pages.

"Restriction Requirement", U.S. Appl. No. 13/482,867, (Sep. 6, 2013), 6 pages.

"Restriction Requirement", U.S. Appl. No. 13/114,359, (Sep. 10, 2013), 6 pages.

"Response to Office Action", U.S. Appl. No. 12/794,406, (Jul. 22, 2013), 9 pages.

"Non-Final Office Action", U.S. Appl. No. 13/118,884, (Dec. 3, 2013), 10 pages.

"Non-Final Office Action", U.S. Appl. No. 13/439,284, (Nov. 8, 2013), 14 pages.

"Non-Final Office Action", U.S. Appl. No. 13/482,867, (Nov. 5, 2013), 13 pages.

"Notice of Allowance", U.S. Appl. No. 12/972,837, (Oct. 11, 2013), 10 pages.

"Restriction Requirement", U.S. Appl. No. 13/039,024, (Oct. 1, 2013), 5 pages.

\* cited by examiner

USER INTERFACE PRESENTING AN ANIMATED AVATAR PERFORMING A MEDIA REACTION

BACKGROUND

People often want to know what other people think about television shows, music, movies, and the like. Currently, a person may find out by contacting his friends and asking them if they liked a particular movie, for example. This approach, however, can be time consuming, incomplete, or inaccurate. Asking friends may take a long while, some friends may not have seen the movie, or some friends may have forgotten much of their impression of the program, and so reply with an inaccurate account.

A person may instead search out reviews of a program, such as published critical reviews, or a source that averages online ratings from critics or typical consumers. This approach, however, can also be time consuming or fail to help the person find out if he or she would like the program because the person may not have similar tastes to those of the movie critic or typical consumer.

SUMMARY

This document describes techniques and apparatuses enabling a user interface for presenting a media reaction. The techniques receive media reactions of a person to a media program, such as the person laughing at one point of a comedy show, then smiling at another point, and then departing at a third point. The techniques may present these and other media reactions in a user interface through which a user may interact. In one embodiment, for example, the techniques present a time-based graph showing a person's reactions over the course of a media program and enabling selection to view the media reaction and/or a portion of the media program corresponding to the media reaction.

This summary is provided to introduce simplified concepts enabling a user interface presenting a media reaction, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and apparatuses enabling a user interface for presenting a media reaction are described with reference to the following drawings. The same numbers are used throughout the drawings to reference like features and components.

DETAILED DESCRIPTION

Overview

This document describes techniques and apparatuses enabling a user interface for presenting a media reaction. The techniques enable users to know how other people reacted to various media programs. A user can quickly and easily see not only who viewed a media program, but what portions they liked or did not like.

Consider, for example, a 30-minute situational comedy, such as The Office, which is typically 22 minutes in total content (eight of the 30 minutes are advertisements). Assume that a user named Melody Pond has not yet watched a particular episode of The Office and wants to know how her sister Amelia Pond, her brother Calvin Pond, and her friend Lydia Brown liked the episode. The techniques enable a user interface that presents media reactions of all three people, assuming that all three have watched that episode. This user interface can present overall impressions of the episode, such as a rating (e.g., four stars), how engaged or interested each person was at each portion of the episode, and states (e.g., laughing, smiling, and talking) for each person throughout the program.

Assume here that Amelia laughed and smiled through most of the episode but cried at one point, Calvin smiled a couple times but was mostly disinterested, and that Lydia was distracted through some portions but laughed in many others. On seeing these media reactions, Melody may select to watch the portion of the episode that caused Amelia to cry, for example. On seeing this portion, Melody may better understand her sister or at least be able to talk with her about that portion of the episode. Melody may instead decide not to watch the episode based on her knowing that she and Calvin have similar tastes in comedies because Calvin didn't seem to enjoy it. Or Melody may select to watch the episode and have Amelia's reactions accompany the episode, such as with an avatar representing Amelia laughing and smiling during the episode at points where Amelia also laughed and smiled.

This is but one example of how techniques and/or apparatuses enabling a user interface presenting a media reaction can be performed. Techniques and/or apparatuses that present and/or determine media reactions are referred to herein separately or in conjunction as the "techniques" as permitted by the context. This document now turns to an example environment in which the techniques can be embodied, after which various example methods for performing the techniques are described.

Example Environment

Figure 1:
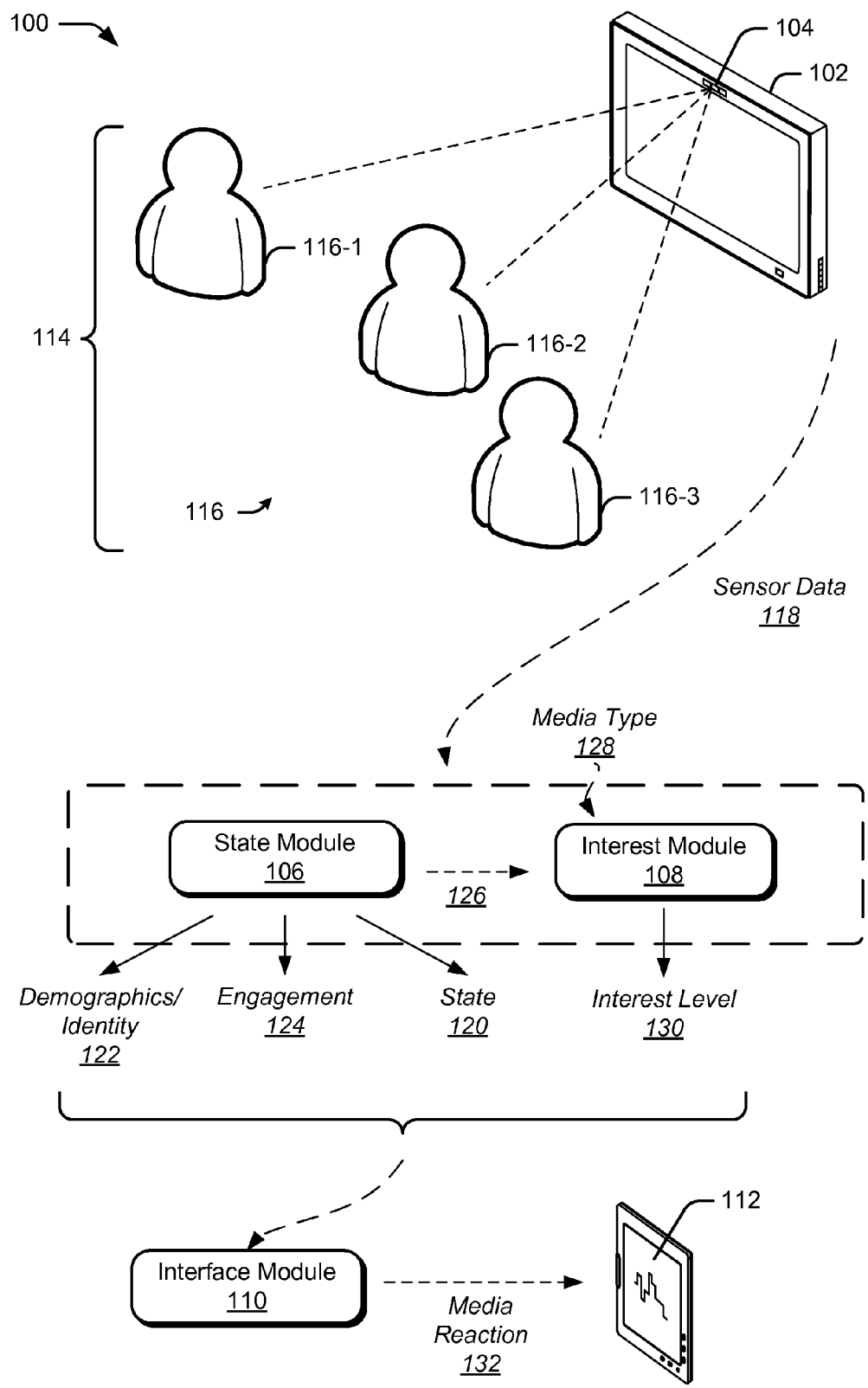
FIG. 1 illustrates an example environment in which techniques enabling a user interface for presenting a media reaction can be implemented.

FIG. 1 is an illustration of an example environment 100 in which the techniques enable a user interface for presenting a media reaction; this environment is also one in which the techniques may receive sensor data and determine media reactions based on this sensor data. Environment 100 includes a media presentation device 102, an audience-sensing device 104, a state module 106, an interest module 108, an interface module 110, and a user interface 112.

Media presentation device 102 presents a media program to an audience 114 having one or more persons 116. A media program can include, alone or in combination, a television show, a movie, a music video, a video clip, an advertisement, a blog, a web page, an e-book, a computer game, a song, a tweet, or other audio and/or video media. Audience 114 can include one or more multiple persons 116 that are in locations enabling consumption of a media program presented by media presentation device 102 and measurement by audience-sensing device 104, whether separately or within one audience 114. In audience 114 three persons are shown: 116-1, 116-2, and 116-3.

Audience-sensing device 104 is capable of passively sensing audience 114 and providing sensor data for audience 114 to state module 106 and/or interest module 108 (sensor data 118 shown provided via an arrow). In this context, sensor data is passive by not requiring active participation of persons in the measurement of those persons. Examples of active sensor data include data recorded by persons in an audience, such as with hand-written logs, and data sensed from users through biometric sensors worn by persons in the audience. Passive sensor data can include data sensed using emitted light or other signals sent by audience-sensing device 104, such as with an infrared sensor bouncing emitted infrared light off of persons or the audience space (e.g., a couch, walls, etc.) and sensing the light that returns. Examples of passive sensor data and ways in which it is measured are provided in greater detail below.

Audience-sensing device 104 may or may not process sensor data prior to providing it to state module 106 and/or interest module 108. Thus, sensor data may be or include raw data or processed data, such as: RGB (Red, Green, Blue) frames; infrared data frames; depth data; heart rate; respiration rate; a person's head orientation or movement (e.g., coordinates in three dimensions, x, y, z, and three angles, pitch, tilt, and yaw); facial (e.g., eyes, nose, and mouth) orientation, movement, or occlusion; skeleton's orientation, movement, or occlusion; audio, which may include information indicating orientation sufficient to determine from which person the audio originated or directly indicating which person, or what words were said, if any; thermal readings sufficient to determine or indicating presence and locations of one of persons 116; and distance from the audience-sensing device 104 or media presentation device 102. In some cases audience-sensing device 104 includes infrared sensors (webcams, Kinect cameras), stereo microphones or directed audio microphones, and a thermal reader (in addition to infrared sensors), though other sensing apparatuses may also or instead be used.

State module 106 receives sensor data and determines, based on the sensor data, states of persons 116 in audience 114 (shown at arrow 120). States include, for example: sad, talking, disgusted, afraid, smiling, scowling, placid, surprised, angry, laughing, screaming, clapping, waving, cheering, looking away, looking toward, leaning away, leaning toward, asleep, or departed, to name just a few.

The talking state can be a general state indicating that a person is talking, though it may also include subcategories based on the content of the speech, such as talking about the media program (related talking) or talking that is unrelated to the media program (unrelated talking) State module 106 can determine which talking category through speech recognition.

State module 106 may also or instead determine, based on sensor data, a number of persons, a person's identity and/or demographic data (shown at 122), or engagement (shown at 124) during presentation. Identity indicates a unique identity for one of persons 116 in audience 114, such as Susan Brown. Demographic data classifies one of persons 116, such as 5 feet, 4 inches tall, young child, and male or female. Engagement indicates whether a person is likely to be paying attention to the media program, such as based on that person's presence or head orientation. Engagement, in some cases, can be determined by state module 106 with lower-resolution or less-processed sensor data compared to that used to determine states. Even so, engagement can be useful in measuring an audience, whether on its own or to determine a person's interest using interest module 108.

Interest module 108 determines, based on sensor data 118 and/or a person's engagement or state (shown with dashed-line arrow 126) and information about the media program (shown at media type arrow 128), that person's interest level (arrow 130) in the media program. Interest module 108 may determine, for example, that multiple laughing states for a media program intended to be a serious drama indicate a low level of interest and conversely, that for a media program intended to be a comedy, that multiple laughing states indicate a high level of interest.

As illustrated in FIG. 1, state module 106 and/or interest module 108 provide demographics/identity 122 as well as one or more of the following media reactions: engagements, shown at arrow 124, states, shown at arrow 120, or interest levels, shown at arrow 130. Based on one or more of these media reactions, state module 106 and/or interest module 108 may also provide another type of media reaction, that of overall media reactions to a media program, such as a rating (e.g., thumbs up or three stars). In some cases, however, media reactions are received and overall media reactions are determined instead by interface module 110.

Figure 2:
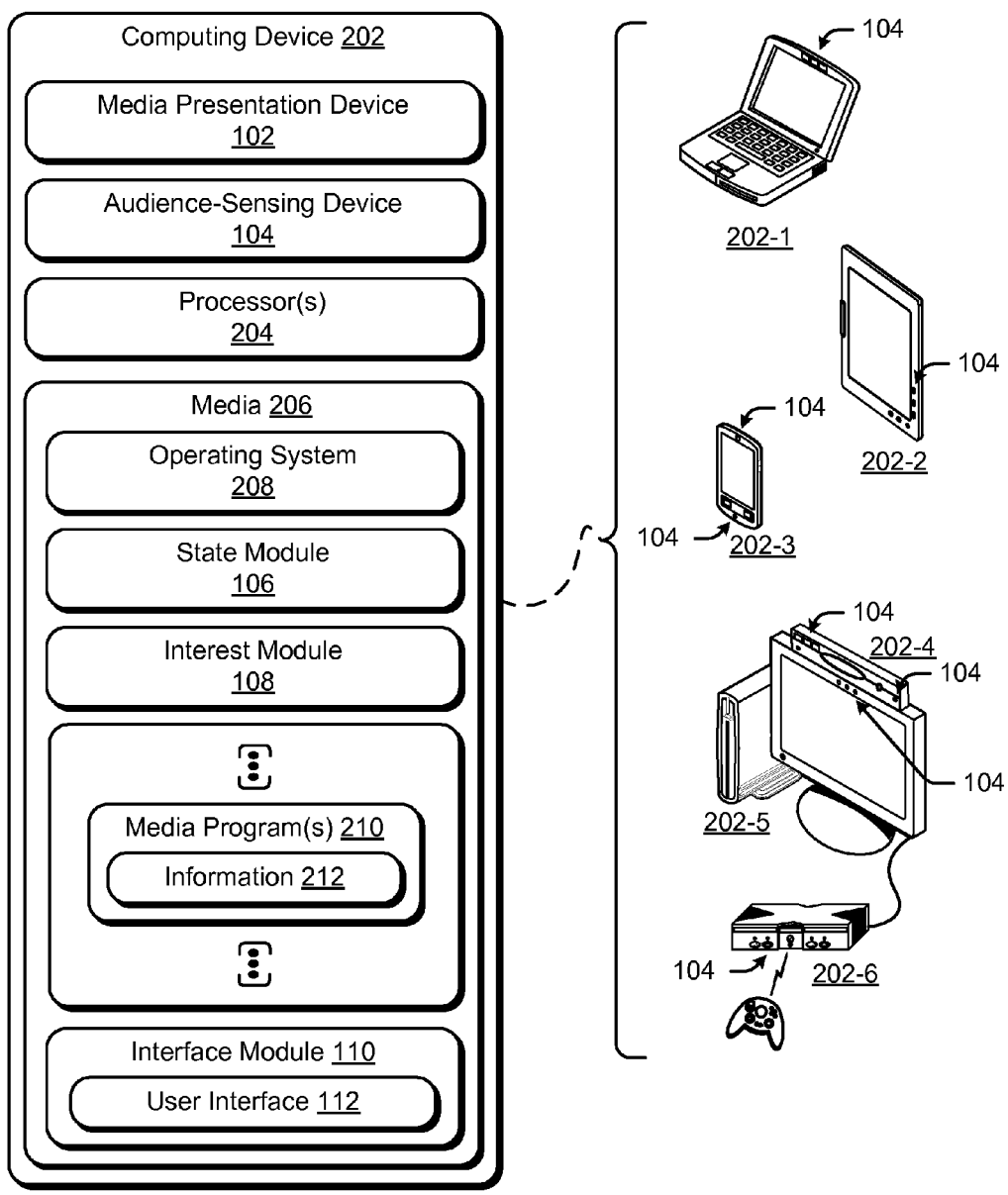
FIG. 2 is an illustration of an example computing device that is local to the audience of FIG. 1.
Figure 3:
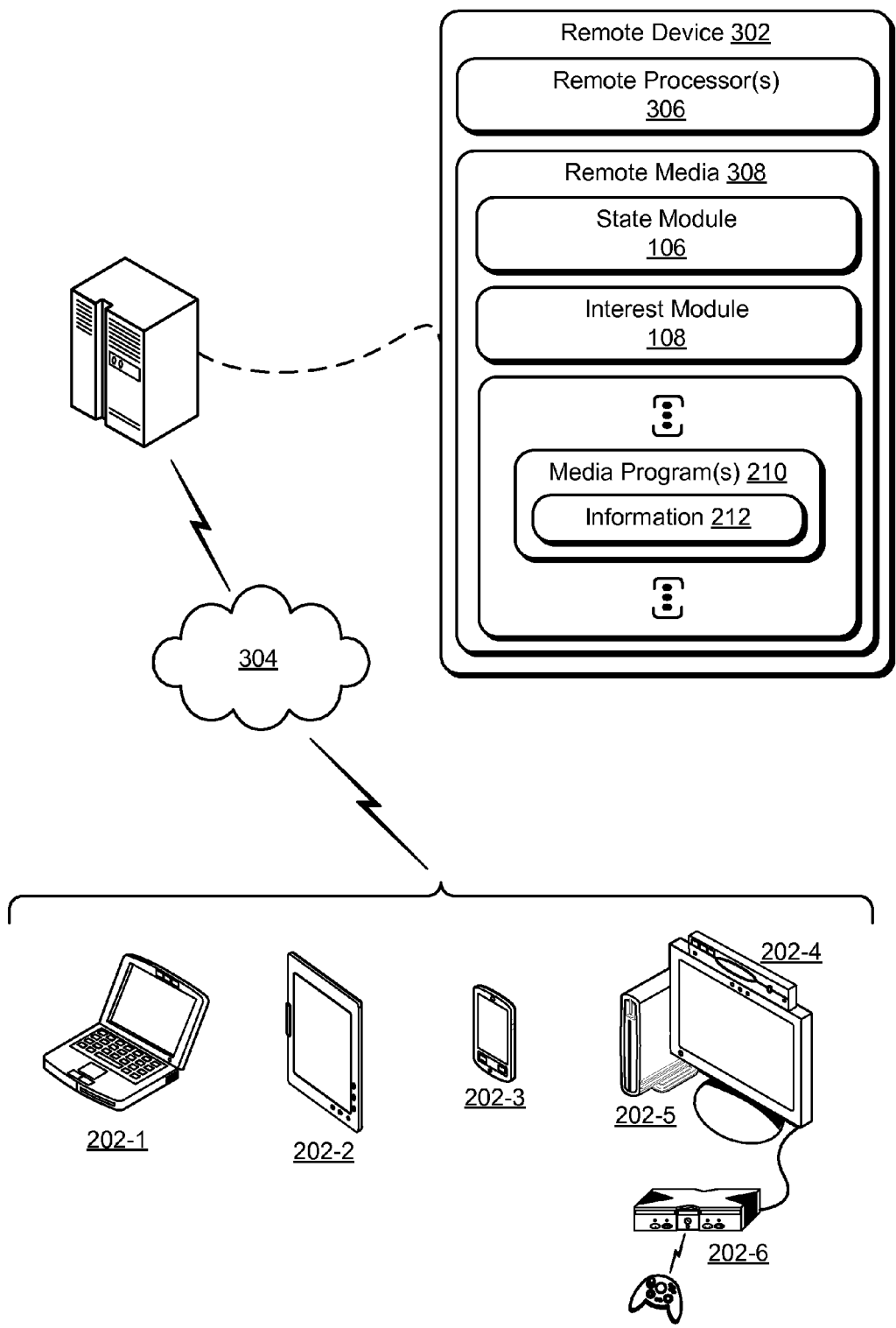
FIG. 3 is an illustration of an example remote computing device that is remote to the audience of FIG. 1.

State module 106 and interest module 108 can be local to audience 114, and thus media presentation device 102 and audience-sensing device 104, though this is not required. An example embodiment where state module 106 and interest module 108 are local to audience 114 is shown in FIG. 2. In some cases, however, state module 106 and/or interest module 108 are remote from audience 114, which is illustrated in FIG. 3.

Interface module 110 receives media reactions (overall or otherwise) and demographics/identity information, and determines or receives some indication as to which media program the reactions pertain. Interface module 110 presents, or causes to be presented, a media reaction (shown at arrow 132) to a media program through user interface 112. This media reaction can be any of the above-mentioned reactions, some of which are presented in a time-based graph to show a person's reaction over the course of the associated media program.

Interface module 110 can be local to audience 114, such as in cases where one person is viewing his or her own media reactions or those of a family member. In many cases, however, interface module 110 receives media reactions from a remote source.

FIG. 2 is an illustration of an example computing device 202 that is local to audience 114. Computing device 202 includes or has access to media presentation device 102, audience-sensing device 104, one or more processors 204, and computer-readable storage media ("media") 206. Media 206 includes an operating system 208, state module 106, interest module 108, media program(s) 210, each of which may include or have associated program information 212, interface module 110, and user interface 112. Note that in this illustrated example, media presentation device 102, audience-sensing device 104, state module 106, interest module 108, and interface module 110 are included within a single computing device, such as a desktop computer having a display, forward-facing camera, microphones, audio output, and the like. Each of these entities 102, 104, 106, 108, and 110, however, may be separate from or integral with each other in one or multiple computing devices or otherwise. As will be described in part below, media presentation device 102 can be integral with audience-sensing device 104 but be separate from state module 106, interest module 108, or interface module 110. Further, each of modules 106, 108, and 110 may operate on separate devices or be combined in one device.

As shown in FIG. 2, computing device(s) 202 can each be one or a combination of various devices, here illustrated with six examples: a laptop computer 202-1, a tablet computer 202-2, a smart phone 202-3, a set-top box 202-4, a desktop 202-5, and a gaming system 202-6, though other computing devices and systems, such as televisions with computing capabilities, netbooks, and cellular phones, may also be used. Note that three of these computing devices 202 include media presentation device 102 and audience-sensing device 104 (laptop computer 202-1, tablet computer 202-2, smart phone 202-3). One device excludes but is in communication with media presentation device 102 and audience-sensing device 104 (desktop 202-5). Two others exclude media presentation device 102 and may or may not include audience-sensing device 104, such as in cases where audience-sensing device 104 is included within media presentation device 102 (set-top box 202-4 and gaming system 202-6).

FIG. 3 is an illustration of an example remote computing device 302 that is remote to audience 114. FIG. 3 also illustrates a communications network 304 through which remote computing device 302 communicates with audience-sensing device 104 (not shown, but embodied within, or in communication with, computing device 202) and/or interface module 110. Communication network 304 may be the Internet, a local-area network, a wide-area network, a wireless network, a USB hub, a computer bus, another mobile communications network, or a combination of these.

Remote computing device 302 includes one or more processors 306 and remote computer-readable storage media ("remote media") 308. Remote media 308 includes state module 106, interest module 108, and media program(s) 210, each of which may include or have associated program information 212. Note that in this illustrated example, media presentation device 102 and audience-sensing device 104 are physically separate from state module 106 and interest module 108, with the first two local to an audience viewing a media program and the second two operating remotely. Thus, as will be described in greater detail below, sensor data is passed from audience-sensing device 104 to one or both of state module 106 or interest module 108, which can be communicated locally (FIG. 2) or remotely (FIG. 3). Further, after determination by state module 106 and/or interest module 108, various media reactions and other information can be communicated to the same or other computing devices 202 for receipt by interface module 110. Thus, in some cases a first of communication devices 202 may measure sensor data, communicate that sensor data to remote device 302, after which remote device 302 communicates media reactions to another of computing devices 202, all through network 304.

These and other capabilities, as well as ways in which entities of FIGS. 1-3 act and interact, are set forth in greater detail below. These entities may be further divided, combined, and so on. The environment 100 of FIG. 1 and the detailed illustrations of FIGS. 2 and 3 illustrate some of many possible environments capable of employing the described techniques.

Example Methods

Figure 4:
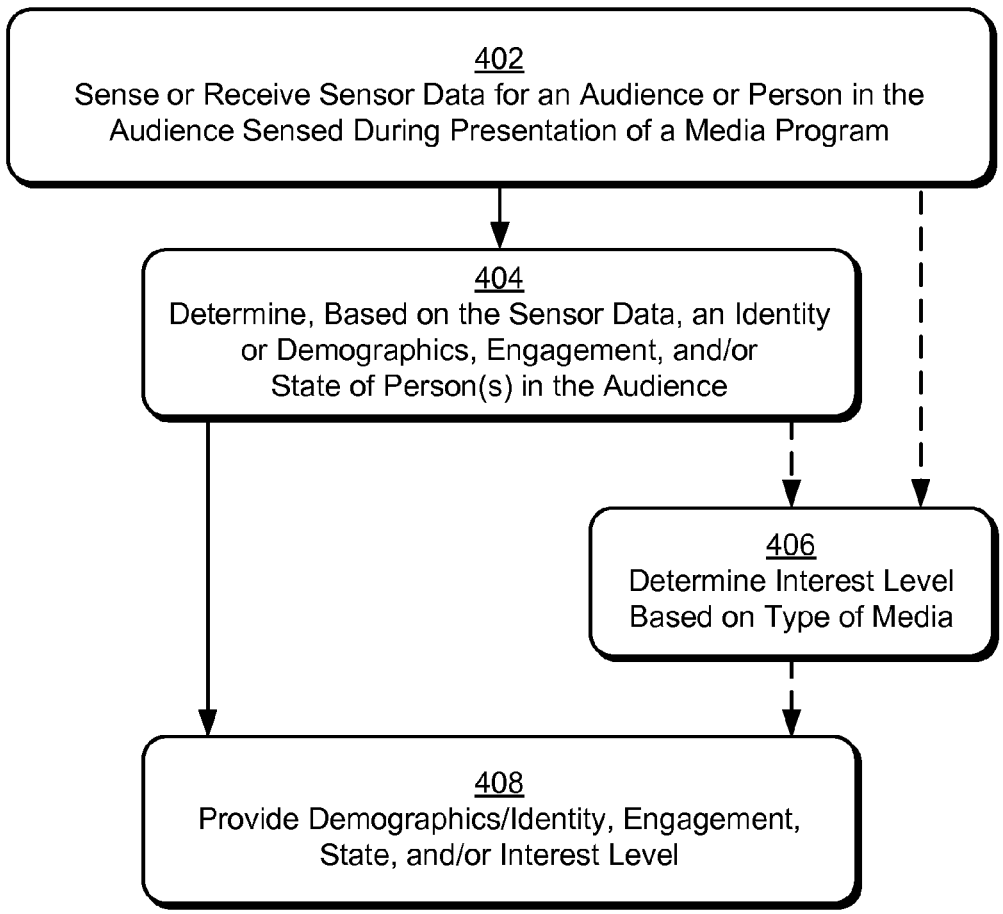
FIG. 4 illustrates example methods for determining media reactions based on passive sensor data.

FIG. 4 depicts methods 400 determines media reactions based on passive sensor data. These and other methods described herein are shown as sets of blocks that specify operations performed but are not necessarily limited to the order shown for performing the operations by the respective blocks. In portions of the following discussion reference may be made to environment 100 of FIG. 1 and entities detailed in FIGS. 2-3, reference to which is made for example only. The techniques are not limited to performance by one entity or multiple entities operating on one device.

Block 402 senses or receives sensor data for an audience or person, the sensor data passively sensed during presentation of a media program to the audience or person.

Consider, for example, a case where an audience includes three persons 116, persons 116-1, 116-2, and 116-3 all of FIG. 1. Assume that media presentation device 102 is an LCD display having speakers and through which the media program is rendered and that the display is in communication with set-top box 202-4 of FIG. 2. Here audience-sensing device 104 is a Kinect, forward-facing high-resolution infra-red red-green-blue sensor and two microphones capable of sensing sound and location that is integral with set-top box 202-4 or media presentation device 102. Assume also that the media program 210 being presented is a PG-rated animated movie named Incredible Family, which is streamed from a remote source and through set-top box 202-4. Set-top box 202-4 presents Incredible Family with six advertisements, spaced one at the beginning of the movie, three in a three-ad block, and two in a two-ad block.

Sensor data is received for all three persons 116 in audience 114; for this example consider first person 116-1. Assume here that, over the course of Incredible Family, that audience-sensing device 104 measures, and then provides at block 402, the following at various times for person 116-1:

Time 1, head orientation 3 degrees, no or low-amplitude audio.
Time 2, head orientation 24 degrees, no audio.
Time 3, skeletal movement (arms), high-amplitude audio.
Time 4, skeletal movement (arms and body), high-amplitude audio.
Time 5, head movement, facial-feature change (20%), moderate-amplitude audio.
Time 6, detailed facial orientation data, no audio.
Time 7, skeletal orientation (missing), no audio.
Time 8, facial orientation, respiration rate.

Block 404 determines, based on the sensor data, a state of the person during the media program. In some cases block 404 determines a probability for the state or multiple probabilities for multiple states, respectively. For example, block 404 may determine a state likely to be correct but with less than full certainty (e.g., 90% chance that the person is laughing). Block 404 may also or instead determine that multiple states are possible based on the sensor data, such as a sad or placid state, and probabilities for each (e.g., sad state 65%, placid state 35%).

Block 404 may also or instead determine demographics, identity, and/or engagement. Further, methods 400 may skip block 404 and proceed directly to block 406, as described later below.

In the ongoing example, state module 106 receives the above-listed sensor data and determines the following corresponding states for person 116-1:

Time 1: Looking toward.
Time 2: Looking away.
Time 3: Clapping.
Time 4: Cheering.
Time 5: Laughing.
Time 6: Smiling.
Time 7: Departed.
Time 8: Asleep.

At Time 1 state module 106 determines, based on the sensor data indicating a 3-degree deviation of person 116-1's head from looking directly at the LCD display and a rule indicating that the looking toward state applies for deviations of less than 20 degrees (by way of example only), that person 116-1's state is looking toward the media program. Similarly, at Time 2, state module 106 determines person 116-1 to be looking away due to the deviation being greater than 20 degrees.

At Time 3, state module 106 determines, based on sensor data indicating that person 116-1 has skeletal movement in his arms and audio that is high amplitude that person 116-1 is clapping. State module 106 may differentiate between clapping and other states, such as cheering, based on the type of arm movement (not indicated above for brevity). Similarly, at Time 4, state module 106 determines that person 116-1 is cheering due to arm movement and high-amplitude audio attributable to person 116-1.

At Time 5, state module 106 determines, based on sensor data indicating that person 116-1 has head movement, facial-feature changes of 20%, and moderate-amplitude audio, that person 116-1 is laughing. Various sensor data can be used to differentiate different states, such as screaming, based on the audio being moderate-amplitude rather than high-amplitude and the facial-feature changes, such as an opening of the mouth and a rising of both eyebrows.

For Time 6, audience-sensing device 104 processes raw sensor data to provide processed sensor data, and in this case facial recognition processing to provide detailed facial orientation data. In conjunction with no audio, state module 106 determines that the detailed facial orientation data (here upturned lip corners, amount of eyelids covering eyes) that person 116-1 is smiling.

At Time 7, state module 106 determines, based on sensor data indicating that person 116-1 has skeletal movement moving away from the audience-sensing device 104, that person 116-1 is departed. The sensor data may indicate this directly as well, such as in cases where audience-sensing device 104 does not sense person 116-1's presence, either through no skeletal or head readings or a thermal signature no longer being received.

At Time 8, state module 106 determines, based on sensor data indicating that person 116-1's facial orientation has not changed over a certain period (e.g., the person's eyes have not blinked) and a steady, slow respiration rate that person 116-1 is asleep.

These eight sensor readings are simplified examples for purpose of explanation. Sensor data may include extensive data as noted elsewhere herein. Further, sensor data may be received measuring an audience every fraction of a second, thereby providing detailed data for tens, hundreds, and thousands of periods during presentation of a media program and from which states or other media reactions may be determined.

Returning to methods 400, block 404 may determine demographics, identity, and engagement in addition to a person's state. State module 106 may determine or receive sensor data from which to determine demographics and identity or receive, from audience-sensing device 104, the demographics or identity. Continuing the ongoing example, the sensor data for person 116-1 may indicate that person 116-1 is John Brown, that person 116-2 is Lydia Brown, and that person 116-3 is Susan Brown, for example. Or sensor data may indicate that person 116-1 is six feet, four inches tall and male (based on skeletal orientation), for example. The sensor data may be received with or include information indicating portions of the sensor data attributable separately to each person in the audience. In this present example, however, assume that audience-sensing device 104 provides three sets of sensor data, with each set indicating the identity of the person along with the sensor data.

Also at block 404, the techniques may determine an engagement of an audience or person in the audience. As noted, this determination can be less refined than that of states of a person, but nonetheless is useful. Assume for the above example, that sensor data is received for person 116-2 (Lydia Brown), and that this sensor data includes only head and skeletal orientation:

Time 1, head orientation 0 degrees, skeletal orientation upper torso forward of lower torso.
Time 2, head orientation 2 degrees, skeletal orientation upper torso forward of lower torso.
Time 3, head orientation 5 degrees, skeletal orientation upper torso approximately even with lower torso.
Time 4, head orientation 2 degrees, skeletal orientation upper torso back from lower torso.
Time 5, head orientation 16 degrees, skeletal orientation upper torso back from lower torso.
Time 6, head orientation 37 degrees, skeletal orientation upper torso back from lower torso.
Time 7, head orientation 5 degrees, skeletal orientation upper torso forward of lower torso.
Time 8, head orientation 1 degree, skeletal orientation upper torso forward of lower torso.

State module 106 receives this sensor data and determines the following corresponding engagement for Lydia Brown:
Time 1: Engagement High.
Time 2: Engagement High.
Time 3: Engagement Medium-High.
Time 4: Engagement Medium.
Time 5: Engagement Medium-Low.
Time 6: Engagement Low.
Time 7: Engagement High.
Time 8: Engagement High.

At Times 1, 2, 7, and 8, state module 106 determines, based on the sensor data indicating a 5-degree-or-less deviation of person 116-2's head from looking directly at the LCD display and skeletal orientation of upper torso forward of lower torso (indicating that Lydia is leaning forward to the media presentation) that Lydia is highly engaged in Incredible Family at these times.

At Time 3, state module 106 determines that Lydia's engagement level has fallen due to Lydia no longer leaning forward. At Time 4, state module 106 determines that Lydia's engagement has fallen further to medium based on Lydia leaning back, even though she is still looking almost directly at Incredible Family.

At Times 5 and 6, state module 106 determines Lydia is less engaged, falling to Medium-Low and then Low engagement based on Lydia still leaning back and looking slightly away (16 degrees) and then significantly away (37 degrees), respectively. Note that at Time 7 Lydia quickly returns to a High engagement, which media creators are likely interested in, as it indicates content found to be exciting or otherwise captivating.

Methods 400 may proceed directly from block 402 to block 406, or from block 404 to block 406 or block 408. If proceeding to block 406 from block 404, the techniques determine an interest level based on the type of media being presented and the person's engagement or state. If proceeding to block 406 from block 402, the techniques determine an interest level based on the type of media being presented and the person's sensor data, without necessarily first or independently determining the person's engagement or state.

Continuing the above examples for persons 116-1 and 116-2, assume that block 406 receives states determined by state module 106 at block 404 for person 116-1 (John Brown). Based on the states for John Brown and information about the media program, interest module 108 determines an interest level, either overall or over time, for Incredible Family. Assume here that Incredible Family is both an adventure and a comedy program, with portions of the movie marked as having one of these media types. While simplified, assume that Times 1 and 2 are marked as comedy, Times 3 and 4 are marked as adventure, Times 5 and 6 are marked as comedy, and that Times 7 and 8 are marked as adventure. Revisiting the states determined by state module 106, consider the following again:

Time 1: Looking toward.
Time 2: Looking away.
Time 3: Clapping.
Time 4: Cheering.
Time 5: Laughing.
Time 6: Smiling.
Time 7: Departed.
Time 8: Asleep.

Based on these states, state module 106 determines for Time 1 that John Brown has a medium-low interest in the content at Time 1—if this were of an adventure or drama type, state module 106 may determine John Brown to instead be highly interested. Here, however, due to the content being comedy and thus intended to elicit laughter or a similar state, interest module 108 determines that John Brown has a medium-low interest at Time 1. Similarly, for Time 2, interest module 108 determines that John Brown has a low interest at Time 2 because his state is not only not laughing or smiling but is looking away.

At Times 3 and 4, interest module 108 determines, based on the adventure type for these times and states of clapping and cheering, that John Brown has a high interest level. At time 6, based on the comedy type and John Brown smiling, that he has a medium interest at this time.

At Times 7 and 8, interest module 108 determines that John Brown has a very low interest. Here the media type is adventure, though in this case interest module 108 would determine John Brown's interest level to be very low for most types of content.

As can be readily seen, advertisers, media providers, and media creators can benefit from knowing a person's interest level. Here assume that the interest level is provided over time for Incredible Family, along with demographic information about John Brown. With this information from numerous demographically similar persons, a media creator may learn that male adults are interested in some of the adventure content but that most of the comedy portions are not interesting, at least for this demographic group.

Figure 5:
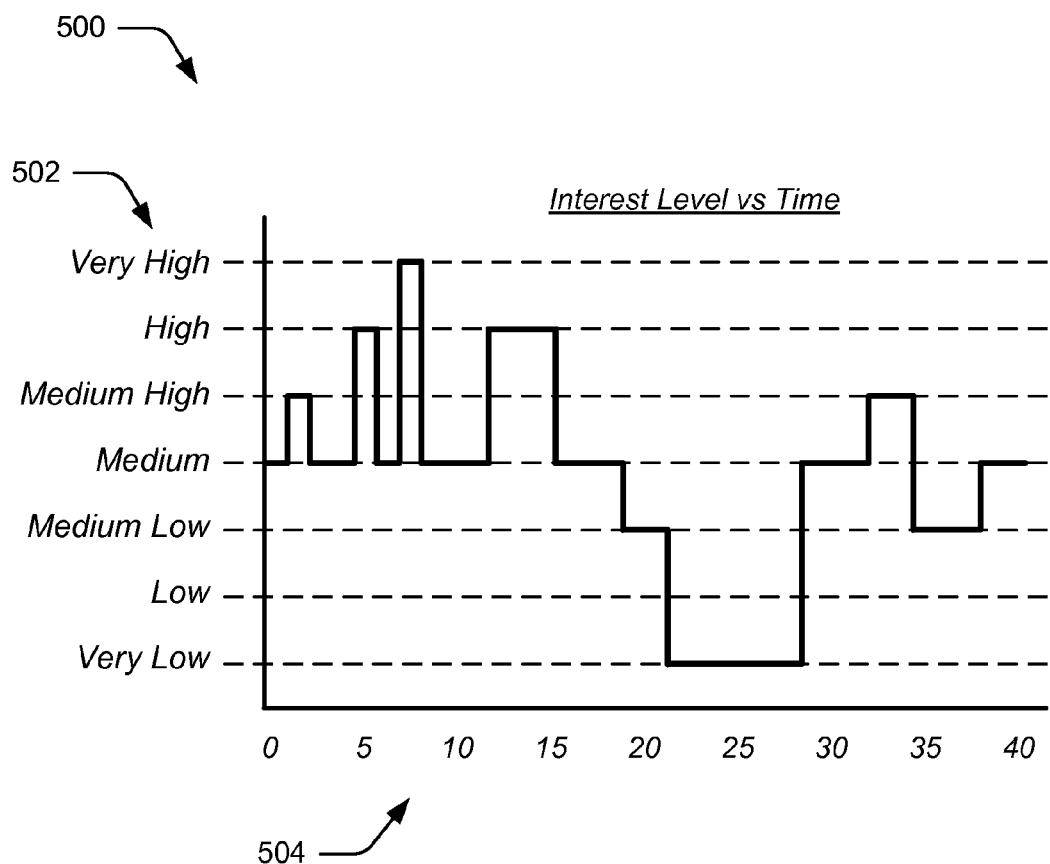
FIG. 5 illustrates a time-based graph of media reactions, the media reactions being interest levels for one person and for forty time periods during presentation of a media program.

Consider, by way of a more-detailed example, FIG. 5, which illustrates a time-based graph 500 having interest levels 502 for forty time periods 504 over a portion of a media program. Here assume that the media program is a movie that includes other media programs—advertisements—at time periods 18 to 30. Interest module 108 determines, as shown, that the person begins with a medium interest level, and then bounces between medium and medium-high, high, and very high interest levels to time period 18. During the first advertisement, which covers time periods 18-22, interest module 108 determines that the person has a medium low interest level. For time periods 23 to 28, however, interest module 108 determines that the person has a very low interest level (because he is looking away and talking or left the room, for example). For the last advertisement, which covers time period 28 to 32, however, interest module 108 determines that the person has a medium interest level for time periods 29 to 32—most of the advertisement. This can be valuable information—the person stayed for the first advertisement, left for the middle advertisement and the beginning of the last advertisement, and returned, with medium interest, for most of the last advertisement. Contrast this resolution and accuracy of interest with some conventional approaches, which likely would provide no information about how many of the people that watched the movie actually watched the advertisements, which ones, and with what amount of interest. If this example is a common trend with the viewing public, prices for advertisements in the middle of a block would go down, and other advertisement prices would be adjusted as well. Or, advertisers and media providers might learn to play shorter advertisement blocks having only two advertisements, for example. Interest levels 502 also provide valuable information about portions of the movie itself, such as through the very high interest level at time period 7 and the waning interest at time periods 35-38.

Note that, in some cases, engagement levels, while useful, may be less useful or accurate than states and interest levels. For example, state module 106 may determine, for just engagement levels, that a person is not engaged if the person's face is occluded (blocked) and thus not looking at the media program. If the person's face is blocked by that person's hands (skeletal orientation) and audio indicates high-volume audio, state module 106, when determining states, may determine the person to be screaming A screaming state indicates, in conjunction with the content being horror or suspense, an interest level that is very high. This is but one example of where an interest level can be markedly different from that of an engagement level.

As noted above, methods 400 may proceed directly from block 402 to block 406. In such a case, interest module 108, either alone or in conjunction with state module 106, determines an interest level based on the type of media (including multiple media types for different portions of a media program) and the sensor data. By way of example, interest module 108 may determine that for sensor data for John Brown at Time 4, which indicates skeletal movement (arms and body), and high-amplitude audio, and a comedy, athletics, conflict-based talk show, adventure-based video game, tweet, or horror types, that John Brown has a high interest level at Time 4. Conversely, interest module 108 may determine that for the same sensor data at Time 4 for a drama, melodrama, or classical music, that John Brown has a low interest level at Time 4. This can be performed based on the sensor data without first determining an engagement level or state, though this may also be performed.

Block 408, either after block 404 or 406, provides the demographics, identity, engagement, state, and/or interest level. State module 106 or interest module 108 may provide this information to various entities, such as interest module 110, as well as advertisers, media creators, and media providers. Providing this information to an advertising entity or media provider can be effective to enable the advertising entity to measure a value of their advertisements shown during a media program or the media provider to set advertisement costs. Providing this information to a media creator can be effective to enable the media creator to assess a potential value of a similar media program or portion thereof. For example, a media creator, prior to releasing the media program to the general public, may determine portions of the media program that are not well received, and thus alter the media program to improve it.

Providing this information to a rating entity can be effective to enable the rating entity to automatically rate the media program for the person. Still other entities, such as a media controller, may use the information to improve media control and presentation. A local controller may pause the media program responsive to all of the persons in the audience departing the room, for example. Providing media reactions to interest module 110 are addressed in detail in other methods described below.

Further, this information may be provided to other entities as well. Providing this information to a rating entity, for example, can be effective to enable the rating entity to automatically rate the media program for the person (e.g., four stars out of five or a "thumbs up"). Providing this information to a media controller, for example, may enable the media controller to improve media control and presentation, such as by pausing the media program responsive to all of the persons in the audience departing the room.

As noted herein, the techniques can determine numerous states for a person over the course of most media programs, even for 15-second advertisements or video snippets. In such a case block 404 is repeated, such as at one-second periods.

Furthermore, state module 106 may determine not only multiple states for a person over time, but also various different states at a particular time. A person may be both laughing and looking away, for example, both of which are states that may be determined and provided or used to determine the person's interest level.

Further still, either or both of state module 106 and interest module 108 may determine engagement, states, and/or interest levels based on historical data in addition to sensor data or media type. In one case a person's historical sensor data is used to normalize the person's engagement, states, or interest levels. If, for example, Susan Brown is viewing a media program and sensor data for her is received, the techniques may normalize or otherwise learn how best to determine engagement, states, and interest levels for her based on her historical sensor data. If Susan Brown's historical sensor data indicates that she is not a particularly expressive or vocal person, the techniques may adjust for this history. Thus, lower-amplitude audio may be sufficient to determine that Susan Brown laughed compared to an amplitude of audio used to determine that a typical person laughed.

In another case, historical engagement, states, or interest levels of the person for which sensor data is received are compared with historical engagement, states, or interest levels for other people. Thus, a lower interest level may be determined for Lydia Brown based on data indicating that she exhibits a high interest for almost every media program she watches compared to other people's interest levels (either generally or for the same media program). In either of these cases the techniques learn over time, and thereby can normalize engagement, states, and/or interest levels.

Figure 6:
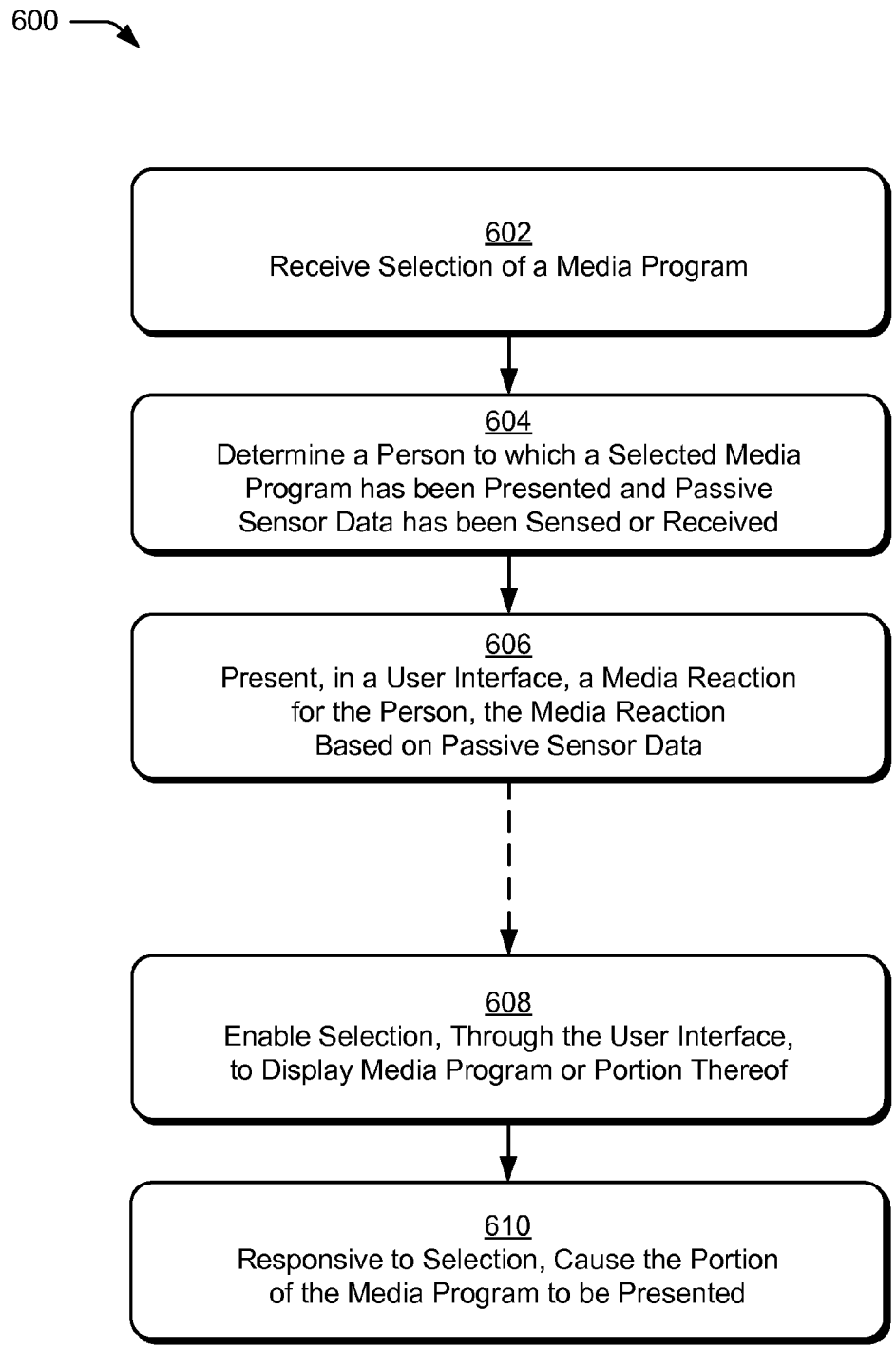
FIG. 6 illustrates example methods for presenting a media reaction to a media program.

FIG. 6 depicts methods 600 enabling a user interface presenting media reactions. Methods 600 are responsive to determining one or more persons to which a selected media program has been presented, though this is not required.

People often want to know how other people reacted to a particular program, such as to compare his or her own reactions to theirs or to decide whether or not to watch the program. By way of example, consider again the above example of Melody Pond wishing to determine which of her friends and family watched a particular episode of The Office and their reactions to it. Here assume that Melody does not yet know which of her friends and family have seen the episode and that she has not yet seen the episode.

Block 602 receives selection of a media program. This can be through selecting an icon, graphic, or label for the media program, or receiving terms for a search inquiry by which to determine the media program, or other manners. Assume here that Melody enters, into a data entry field (not shown) of user interface 112, the search terms: "the office". In response, interface module 110 presents likely candidates, such as a movie named "the office" and the last three episodes of the television show The Office. In response, Melody selects the most-recent episode of the television show, episode 104.

Block 604 determines a person to which a selected media program has been presented and passive sensor data has been sensed during the presentation of the selected media program to the person or for which media reactions have been received. Block 604 may determine persons from a group that have indicated a selection to share media reactions with the user of the user interface, such as friends and family. Block 604 may also or instead find other people that the user doesn't know, such as published critics or famous people for which passive sensor data has been recorded. For this example, Melody's friends and family are found, namely Calvin Pond, Lydia Brown, and Amelia Pond.

At some point media reactions for a person are received by interface module 110, whether from a local or remote state module 106 or interest module 108 (e.g., at computing device 202 or remote device 302, respectively).

Block 606 presents, in a user interface, a media reaction for the person, the media reaction determined based on the passive sensor data sensed during the presentation of the selected media program to the person. The media reaction can include any of the reactions noted above, such as an overall rating for the program or a time-based graph showing reactions over the course of the program, to name just two.

A time-based graph shows media reactions for the person over at least some portion of the media program, such as at particular time periods. Interface module 110 may present the media reactions in a lower-resolution format, such as by aggregating or averaging these media reactions. If media reactions are received in one-second time periods, for example, interface module 110 may average these into larger (e.g., five- or ten-second) time periods. By so doing, a user may more-easily consume the information. Interface module 110, however, may also enable the user to select to view the original, higher resolution as well.

Figure 7:
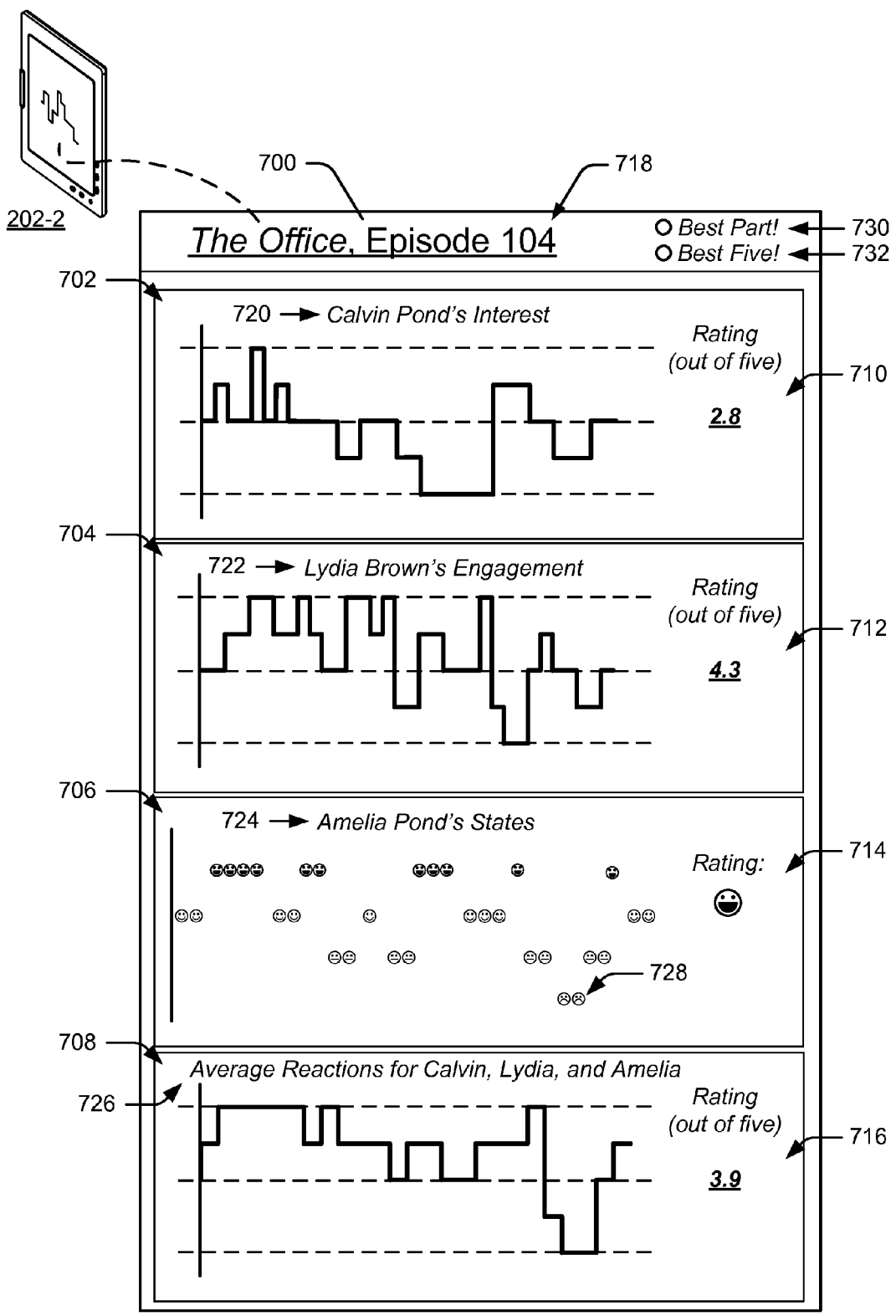
FIG. 7 illustrates a tablet computer of FIG. 2 with a graphical user interface presenting time-based graphs and ratings for three persons for a media program.

Consider, for example, FIG. 7, which illustrates tablet computer 202-2 with a graphical user interface 700 presenting time-based graphs and ratings for three persons for a media program. Continuing the ongoing example, three persons are determined: Amelia Pond, Calvin Pond, and Lydia Brown. For breadth of illustration, each of the time-based graphs show different categories of media reactions, namely engagement, interest level, and state, each of which are described above, as well as an average of these three in one time-based graph. The four graphs each present 44 media reactions (separately or as an average), one for each 30-second time period of 22 total minutes of media content.

Interest level graph 702 shows interest levels over the 44 time periods for Calvin Pond. Interest level graph 702 shows that Calvin had a medium to very low interest level through much of the program.

Engagement graph 704 shows engagements over the 44 time periods for Lydia Brown. Engagement graph 704 shows that Lydia was highly engaged for much of the program. Here assume that Lydia watched the program through a mobile device having a lower-resolution audience-sensing device (e.g., a camera in smart phone 202-3) and thus engagements for Lydia were received.

State graph 706 shows states over the 44 time periods for Amelia Pond. State graph 706 shows that Amelia was laughing or smiling through most of the program. For visual brevity, state graph 706 shows four states, laughing, smiling, looking-away, and crying.

Average reaction graph 708 shows an average of Calvin's interest levels, Lydia's engagement, and Amelia's states. This can be useful to the user to gauge how his or her friends (in this case Melody Pond) liked the media program. An average of reactions can be any mix of reactions or just include states, engagements, or interest levels of multiple people, though this is not required. Here the average includes all three of interest levels, engagements, and states. To produce this average, the techniques may convert any non-numerical reactions, such as Amelia's states, to a number for averaging, as well as normalize and/or weight one or more of the reactions.

Graphical user interface 700 also presents four ratings, 710, 712, 714, and 716. These ratings are based on the reactions received or can be received themselves. Thus, these ratings can be determined automatically by state module 106, interest module 108, or interface module 110, or they may be based on a manual selection by the person. The first rating, 710, indicates that Calvin's rating is 2.8 out of five, which corresponds to interest level graph 702. The second rating, 712, indicates that Lydia's rating is 4.3 out of five, which corresponds to her high engagement throughout the program. The third rating, 714, summarizes Amelia's most-common state, that of laughing, and presents a laughing graphic to show this rating. The fourth rating, 716, is an average of the first, second, and third ratings, with the third rating converted into a number (4.5) to produce the fourth rating of 3.9.

Graphical user interface 700 presents an identity of the media program (The Office, Episode 104) at 718 and identifiers for individual persons at 720, 722, and 724, and a conglomerate of these individual persons at 726, which here are the person's names, though icons, avatars, graphics, or other identifiers may be used.

Returning to methods 600, the techniques may optionally enable selection, through the user interface, to display the media program or a portion thereof. This option is shown at block 608. Interface module 110 can enable selection to play all of the media program, for example, through selection of the identifier (here 718 in graphical user interface 700). A portion or portions may also be selected. Consider a case where the media reactions are presented with some correlation or associated with portions of the media program, such as with time periods in the above-described time-based graphs.

In such a case, block 608 enables selection, through the time-based graph of the user interface, to display a portion of the media program corresponding to a media reaction, such as a very high engagement in engagement graph 704 or a crying state in state graph 706. Thus, a user of graphical user interface 700, such as Melody Pond, may select a crying icon 728 in state graph 706 to see the portion of The Office during which Amelia cried. Further, interface module 110 enables users to select to see the media program in conjunction with a representation of a person's media reactions, such as through an animated avatar performing a state (e.g., laughing, clapping, or cheering) or indicating an engagement or interest level of the media reactions.

Likewise, consider a second case where a portion or portions of the media program may be selected through graphical user interface 700. Assume that a user wishes to see the best parts of a media program—such as parts where the user or one or more friends laughed at a comedy or cried during a melodrama. In the ongoing example, assume Melody Pond wishes to see the funniest parts of The Office, Episode 104, based on all three of her friend's reactions. In such a case, block 608 enables selection to display a portion or portions of the media program. Here Melody Pond may select a "Best Part!" control 730 or a "Best Five!" control 732 to see portions of The Office where all of her friends laughed (control 730) or all of them laughed or at least smiled (control 732). As in the above examples, interface module 110 may enable users to see these portions alone or in conjunction with a representation of one or more persons' media reactions.

Block 610, responsive to selection of the media program or portion thereof, causes the media program or portion to be presented. Interface module 110, for example, may cause a television to present the portion of the media program or pop up a window showing the portion over or within graphical user interface 700. In cases where the media program is selected to be presented in conjunction with a representation of the person's media reactions, interface module 110 may render the program with an avatar presented in a corner of the display, for example. Interface module 110 is not limited to representing reactions of one person, interface module 110 may present The Office with avatars for all three of Calvin, Lydia, and Amelia to show their reactions during the program.

Concluding the ongoing example, interface module 110 at block 610, in response to selection of crying icon 722, presents a 30-second clip of The Office within a portion of graphical user interface 700.

Figure 8:
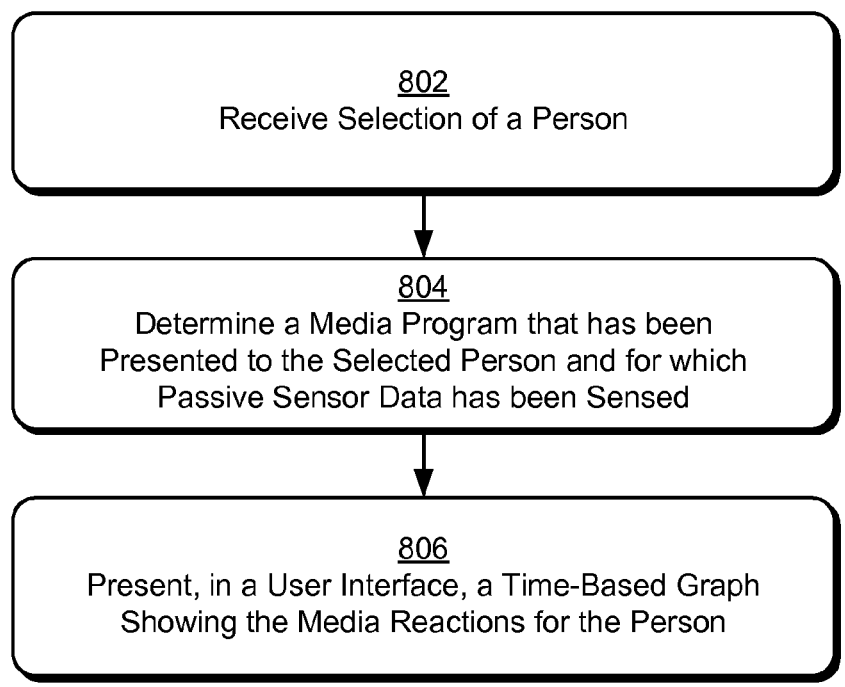
FIG. 8 illustrates example methods for presenting a media reaction to a media program.

FIG. 8 depicts methods 800 enabling a user interface presenting media reactions. Methods 800 present media reactions for media programs responsive to determining which media programs a selected person has seen, though this is not required. The techniques may perform methods 400, 600, and/or 800, alone or in conjunction with each other, in whole or in part.

Block 802 receives selection of a person. The person may be selected through a user interface through which media reactions will be displayed, such as through a graphical representation or other identifier of the person, though this is not required.

Block 804 determines a media program that has been presented to the selected person and for which passive sensor data has been sensed during the presentation of the media program to the selected person.

By way of example, consider a case where a user of user interface 112 of FIG. 1 wishes to know what his best friend has watched over the last month. Assume that the user knows that he has similar tastes as his best friend and so would like to find out which programs his best friend liked. The techniques can enable the user to quickly and easily see what his best friend has watched as well as overall ratings for these programs and/or reactions to various portions of the programs.

Block 806 presents, in a user interface, a time-based graph for the person, the time-based graph showing media reactions for the person and determined based on the passive sensor data sensed during the presentation of the selected media program to the person. Interface module 110 may repeat block 804 and 806 to show numerous graphs for numerous media programs, such as time-based graphs for three movies, nine television shows, four music videos, twelve tweets, and six video clips. Interface module 110 may arrange these by media category, such as movies together, then television shows, and so forth, or by rating (e.g., highest rating to lowest rating), or by order viewed, to name just a few.

The preceding discussion describes methods relating to determining or presenting a person's media reactions based on passive sensor data. Aspects of these methods may be implemented in hardware (e.g., fixed logic circuitry), firmware, software, manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing mode by multiple computing devices. Further, the features described herein are platform-independent and can be implemented on a variety of computing platforms having a variety of processors.

These techniques may be embodied on one or more of the entities shown in FIGS. 1-3 and 9 (device 900 is described below), which may be further divided, combined, and so on. Thus, these figures illustrate some of many possible systems or apparatuses capable of employing the described techniques. The entities of these figures generally represent software, firmware, hardware, whole devices or networks, or a combination thereof. In the case of a software implementation, for instance, the entities (e.g., state module 106, interest module 108, and interface module 110) represent program code that performs specified tasks when executed on a processor (e.g., processor(s) 204 and/or 306). The program code can be stored in one or more computer-readable memory devices, such as media 206 and/or 308 or computer-readable media 914 of FIG. 9.

Example Device

Figure 9:
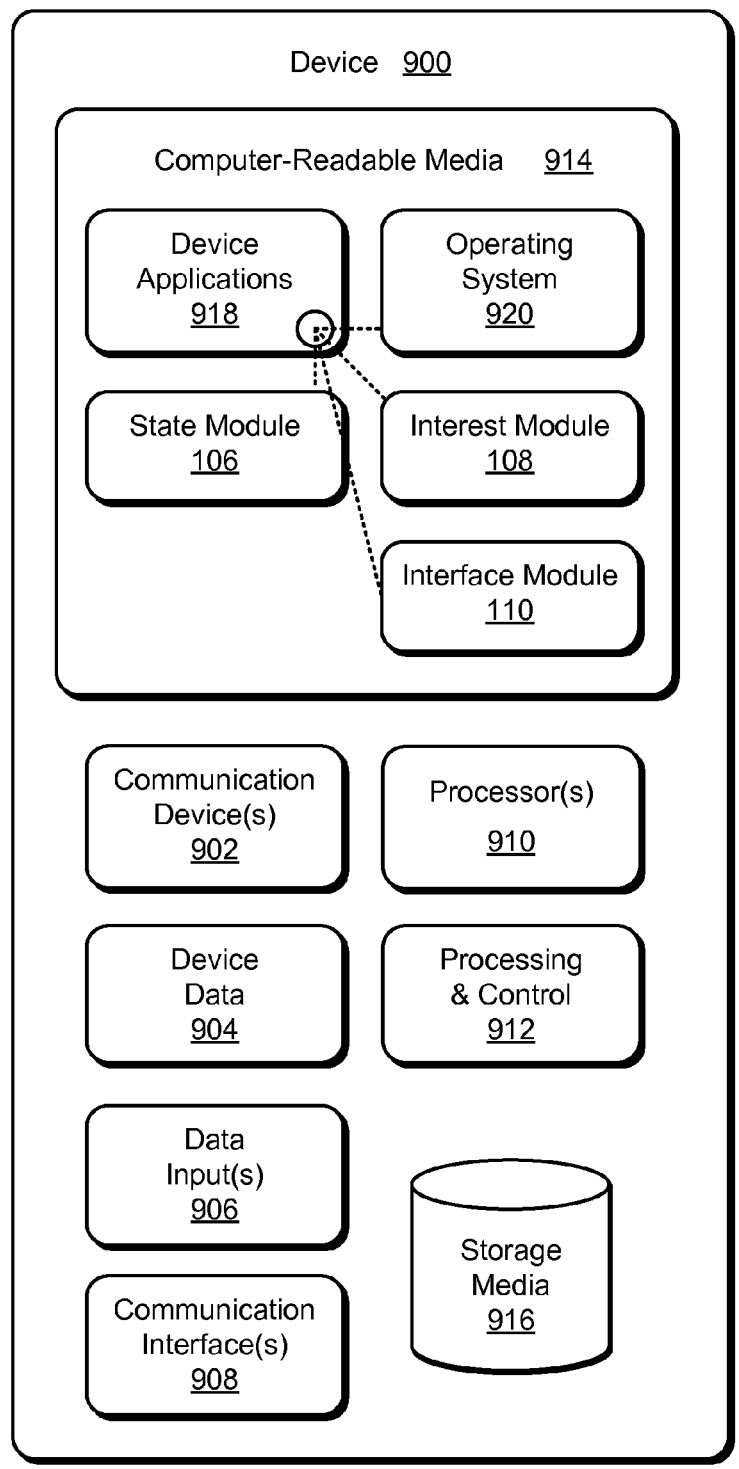
FIG. 9 illustrates an example device in which techniques enabling a user interface presenting a media reaction can be implemented.

FIG. 9 illustrates various components of example device 900 that can be implemented as any type of client, server, and/or computing device as described with reference to the previous FIGS. 1-8 to implement techniques enabling a user interface presenting a media reaction. In embodiments, device 900 can be implemented as one or a combination of a wired and/or wireless device, as a form of television mobile computing device (e.g., television set-top box, digital video recorder (DVR), etc.), consumer device, computer device, server device, portable computer device, user device, communication device, video processing and/or rendering device, appliance device, gaming device, electronic device, System-on-Chip (SoC), and/or as another type of device or portion thereof. Device 900 may also be associated with a user (e.g., a person) and/or an entity that operates the device such that a device describes logical devices that include users, software, firmware, and/or a combination of devices.

Device 900 includes communication devices 902 that enable wired and/or wireless communication of device data 904 (e.g., received data, data that is being received, data scheduled for broadcast, data packets of the data, etc.). Device data 904 or other device content can include configuration settings of the device, media content stored on the device (e.g., media programs 210), and/or information associated with a user of the device. Media content stored on device 900 can include any type of audio, video, and/or image data. Device 900 includes one or more data inputs 906 via which any type of data, media content, and/or inputs can be received, such as human utterances, user-selectable inputs, messages, music, television media content, recorded video content, and any other type of audio, video, and/or image data received from any content and/or data source.

Device 900 also includes communication interfaces 908, which can be implemented as any one or more of a serial and/or parallel interface, a wireless interface, any type of network interface, a modem, and as any other type of communication interface. Communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like), which process various computer-executable instructions to control the operation of device 900 and to enable techniques enabling a user interface presenting a media reaction. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable storage media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable storage media 914 provides data storage mechanisms to store device data 904, as well as various device applications 918 and any other types of information and/or data related to operational aspects of device 900. For example, an operating system 920 can be maintained as a computer application with computer-readable storage media 914 and executed on processors 910. Device applications 918 may include a device manager, such as any form of a control application, software application, signal-processing and control module, code that is native to a particular device, a hardware abstraction layer for a particular device, and so on.

Device applications 918 also include any system components, engines, or modules to implement techniques enabling a user interface presenting a media reaction. In this example, device applications 918 can include state module 106, interest module 108, or interface module 110.

Conclusion

Although embodiments of techniques and apparatuses enabling a user interface presenting a media reaction have been described in language specific to features and/or methods, it is to be understood that the subject of the appended claims is not necessarily limited to the specific features or methods described. Rather, the specific features and methods are disclosed as example implementations enabling a user interface presenting a media reaction.

What claimed is:

1. A computer-implemented method comprising:
   determining a person to which a selected media program has been presented and passive sensor data has been sensed during the presentation of the selected media program to the person; and
   presenting, in a user interface, an animated avatar performing a media reaction corresponding to a reaction for the person during the presentation of the selected media program to the person, the media reaction including a clapping, cheering, laughing, screaming, looking toward, looking away, smiling, departed, crying, or sleeping state, the media reaction determined based on the passive sensor data sensed for the person during the presentation of the selected media program.

2. A computer-implemented method as described in claim 1, further comprising presenting multiple other animated avatars performing multiple other media reactions in a time-based state graph for the person.

3. A computer-implemented method as described in claim 1, further comprising presenting a rating automatically determined for the person based on the passive sensor data.

4. A computer-implemented method as described in claim 1, wherein determining the person determines the person from a group of persons that have selected to share media reactions with a second person, the second person associated with the user interface or associated with a computing device through which the user interface is presented.

5. A computer-implemented method as described in claim 1, further comprising determining one or more other persons to which the selected media program has been presented and other passive sensor data has been sensed during the presentation of the selected media program to the one or more other persons and presenting, in the user interface, another media reaction corresponding to another reaction for each of the one or more other persons.

6. A computer-implemented method as described in claim 1, further comprising enabling selection, through the user interface, to display the selected media program or a portion thereof, and responsive to selection, causing display of the selected media program or portion thereof.

7. A computer-implemented method as described in claim 6, wherein causing display of the selected media program or portion thereof presents the selected media program or portion thereof in the user interface.

8. A computer-implemented method as described in claim 6, further comprising causing a representation of the media reaction to be displayed with display of the selected media program or portion thereof.

9. A computer-implemented method as described in claim 1, further comprising, prior to presenting the animated avatar performing the media reaction corresponding to the reaction for the person, receiving a search inquiry through the user interface and determining, based on the search inquiry, the selected media program.

10. A computer-implemented method as described in claim 1, further comprising, prior to presenting the animated avatar performing the media reaction corresponding to the reaction for the person, determining the media reaction based on the passive sensor data sensed during the presentation of the selected media program to the person.

11. A computer-implemented method comprising:
determining a media program that has been presented to a selected person and for which passive sensor data has been sensed during the presentation of the media program to the selected person; and
presenting, in a user interface, an animated avatar performing a media reaction representing a reaction for the person, the media reaction including a clapping, cheering, laughing, screaming, looking toward, looking away, smiling, departed, crying, or sleeping state, the media reaction determined based on the passive sensor data sensed during the presentation of the selected media program to the person.

12. A computer-implemented method as described in claim 11, further comprising presenting multiple other animated avatars performing multiple other media reactions in a time-based state graph.

13. A computer-implemented method as described in claim 11, further comprising determining multiple other media programs that have been presented to the selected person and for which passive sensor data has been sensed during the presentations of the media programs and, responsive to determining the multiple other media programs, presenting another media reaction corresponding to another reaction for each of the multiple other media programs within the user interface.

14. A computer-implemented method as described in claim 13, wherein the other media reactions each include multiple other media reactions and presenting another media reaction for each of the multiple other media programs within the user interface presents time-based graphs for each of the other media reactions.

15. A computer-implemented method as described in claim 14, wherein presenting the time-based graphs presents the time-based graphs in the user interface arranged by order of viewing, media category, or rating for the respective media programs.

16. A computer-implemented method as described in claim 11, further comprising presenting a rating automatically determined for the person based on the passive sensor data.

17. A computer-implemented method as described in claim 11, further comprising determining the media reaction.

18. A computer-implemented method as described in claim 11, wherein the media reaction further includes a sad, a related talking, an unrelated talking, a disgusted, an afraid, a scowling, a placid, a surprised, a waving, a leaning-away, a leaning-toward, or an angry state.

19. A computer-implemented method comprising:
receiving media reactions for a person, the media reactions determined based on sensor data passively sensed at time periods during which a media program is presented to the person;
presenting, in a user interface, a time-based graph, the time-based graph showing the media reactions for the person at the time periods;
enabling selection, through the time-based graph of the user interface, to display a portion of the media program associated with one of the media reactions; and
responsive to selection of the portion of the media program, causing:
the portion of the media program to be presented; and
an animated avatar to be presented in conjunction with the portion of the media program, the animated avatar clapping, cheering, laughing, screaming, looking toward, looking away, smiling, departed, crying, or sleeping in correspondence with one of the media reactions for the person.

20. A computer-implemented method as described in claim 19, wherein the media reactions include states of the person, the states including one or more of: a sad, a related talking, an unrelated talking, a disgusted, an afraid, a scowling, a placid, a surprised, an angry, a waving, a leaning-away, or a leaning-toward state.

* * * * *